United States Patent
Okazaki

(10) Patent No.: US 7,336,895 B2
(45) Date of Patent: Feb. 26, 2008

(54) DIFFUSER PANEL AND OPTICAL APPARATUS WHICH USES THIS DIFFUSER PANEL

(75) Inventor: Ayako Okazaki, Hino (JP)

(73) Assignee: Olympus Corporation, Tokyo (JP)

(\*) Notice: Subject to any disclaimer, the term of this patent is extended or adjusted under 35 U.S.C. 154(b) by 350 days.

(21) Appl. No.: 11/047,658

(22) Filed: Feb. 2, 2005

(65) Prior Publication Data

US 2005/0169008 A1    Aug. 4, 2005

(30) Foreign Application Priority Data

Feb. 3, 2004    (JP)    ............................. 2004-026167

(51) Int. Cl.
*G03B 13/24*    (2006.01)
*G02B 5/02*    (2006.01)

(52) U.S. Cl. ..................................... 396/150; 359/599
(58) Field of Classification Search ................ 396/150, 396/382; 359/599; 348/208.2
See application file for complete search history.

(56) References Cited

U.S. PATENT DOCUMENTS

| 4,567,123 | A | | 1/1986 | Ohtaka et al. |
| 5,085,977 | A | * | 2/1992 | Sugawara et al. ........... 430/321 |
| 5,089,835 | A | * | 2/1992 | Kitagishi .................... 396/150 |
| 5,124,839 | A | * | 6/1992 | Yamazaki et al. .......... 359/454 |
| 5,696,630 | A | * | 12/1997 | Hayashi ...................... 359/599 |
| 6,516,152 | B1 | | 2/2003 | Mukai et al. |
| 2002/0034710 | A1 | * | 3/2002 | Morris et al. ............... 430/321 |
| 2003/0002871 | A1 | * | 1/2003 | Ohmura ...................... 396/150 |

FOREIGN PATENT DOCUMENTS

JP    58-060642    4/1983
JP    59-189330    10/1984

\* cited by examiner

*Primary Examiner*—Christopher Mahoney
(74) *Attorney, Agent, or Firm*—Kenyon & Kenyon LLP

(57) ABSTRACT

A diffuser panel having a plurality of micro lenses arranged on a surface of a substrate, a half or more of these micro lenses are in a shape which has (2n+1) angles. This diffuser panel provides rays which are uniformly diffused within a diffusion area and a light amount distribution which changes smoothly. This diffuser panel provides a bright image having a naturally blurred impression when the diffuser panel is used as a focusing panel of an optical apparatus.

21 Claims, 21 Drawing Sheets

DIFFUSER PANEL AND OPTICAL APPARATUS WHICH USES THIS DIFFUSER PANEL

BACKGROUND OF THE INVENTION

1. Field of the Invention

The present invention relates to a diffuser panel and an optical apparatus which uses this diffuser panel.

2. Description of the Prior Art

A diffuser panel is an optical element for allowing rays incident in a certain direction to emerge in various directions. FIG. 26 shows a condition where incident rays are diffused by a transmission type diffuser panel 40. In this example, diffused rays are spread in a conical form. In this case, rays which have transmitted through the diffuser panel reach within a circular area D on a screen 41. A characteristic of a diffuser panel (hereinafter referred to as a diffusion characteristic) can be expressed by a diffusion angle representing a spread of the diffused rays and a brightness distribution of the rays within the circular area D. In addition, an area reached by diffused rays (the circular area D in the case of FIG. 26) is referred to as a diffusion area.

Known as a conventional examples of such a diffuser panel are diffuser panels which are disclosed by Japanese Patents Kokai Publication No. Sho 58-60642, No. Sho 57-148728, No. Sho 59-189330 and No. 2000-321626.

Diffusion characteristics of such diffuser panels are determined in most cases by surface configurations of the diffuser panels. Ground glass, for example, is conventionally known as a conventional diffuser panel which has fine convexities and concavities formed at random on a surface of a substrate. Furthermore, there is also known a diffuser panel which has micro lenses formed on a surface of s substrate.

These diffuser angels are used also in optical apparatuses. An example is a focusing panel which is used in an a single lens reflex camera. This focusing panel is disposed at a location which is optically equivalent to an image pickup surface in the camera.

In this single-lens reflex camera, rays which have passed through a photographic lens are incident on the focusing panel (diffuser panel). The rays which are incident on the focusing panel form an image of an object on this focusing panel. At this time, the rays which form the image of the object (incident rays) are diffused by the focusing panel and allowed to emerge as diffused rays. A diffusing surface of the focusing panel is configured so as to limit an angle within which the rays are diffused. Accordingly, the rays which form the image of the object are not diffused completely by the focusing panel. A photographer can therefore observe through a view finder the image of the object projected onto the focusing panel.

When the object is in focus (in a focused condition), a clear image is formed on the focusing panel. When the object is out of focus (defocused condition), in contrast, the image is blurred on the focusing panel. At this time, a blurred condition of the image is further emphasized by a diffusing function of the focusing panel. As a result, the photographer can confirm a composition and focused/defocused condition of the object.

From a viewpoint of the fact described above, it is required for a focusing panel to have characteristics to provide natural blurred impression, brightness, facilitation of focusing and so on. The blur, brightness and facilitation of focusing and so on are associated with a diffusion characteristic of the focusing panel (diffuser panel). A diffuser panel which has a larger diffusion angle, for example, more remarkably blurs an image as observed through a view finder. Accordingly, the differ panel which has the larger diffusion angle allows an image to be brought into focus easier but darkens an observed image.

The above expression "natural blur" means a condition where spot images are spread uniformly when an object is out of focus.

It is generally said that the diffuser panel disclosed by Japanese Patent Kokai Publication No. Sho 57-148728 provides natural blur. This diffuser panel has a surface in a sand-blasted condition. This surface in the sand-blasted condition is formed, for example, by dropping sand having a certain definite grain size onto a surface of a substrate in a definite amount per second over a sufficiently wide area.

Such a diffuser panel has a large diffusion angle. Furthermore, a brightness distribution within a diffusion area changes gently from a center toward a margin as shown in FIG. 27. Therefore, assume that a parallel light bundle is allowed to be incident on an entire surface of a diffuser panel 40 as shown in FIG. 28. In this case, rays which are allowed to emerge from the diffuser panel 40 are a total sum of diffused rays which have a diffusion characteristic shown in FIG. 27. Brightness is therefore uniform on a screen 41.

A diffuser panel which has such a diffusion characteristic provide favorable blur when the diffuser panel is used as a focusing panel. However, this diffuser panel has too large a diffusion angle, thereby darkening an image as observed through a view finder.

Known as conventional examples which have corrected a defect of darkening observed images are the diffuser panel (focusing panel) disclosed by the above-mentioned Japanese Patent Kokai Publication No. Sho 57-148728 and the diffuser panel (focusing panel) disclosed by the above-mentioned Japanese Patent Kokai Publication No. Sho 59-189330.

Out of these diffuser panels (focusing panels), the diffuser panel disclosed by Japanese Patent Kokai Publication No. Sho 57-148728 has a configuration shown in FIG. 30. Speaking concretely, this diffuser panel has a configuration in which micro lenses having a circular outer circumferential shape are arranged periodically on a surface of a substrate.

Furthermore, another conventional diffuser panel (focusing panel) uses micro lenses which have a regularly hexagonal outer circumferential shape and are periodically arranged with no gaps on a surface of a substrate as shown in FIG. 32.

These conventional diffuser panels (focusing plates) are capable of limiting spreads of diffusion angles (sizes of diffusion area). These diffuser panels are therefore capable of brightening images more easily than ground glass used as a diffuser panel.

An image of an object is formed on a focusing panel of a single-lens reflex camera as described above. However, objects to be photographed are not only those which have uniform brightness but also others which have various bright-dark patterns. Accordingly, rays at uniform brightness are rarely incident over an entire surface of focusing panel but bright and dark rays are incident mixedly on focusing panels.

FIG. 29 shows a condition where rays having bright and dark patterns are incident on a focusing panel 40. In this drawing, the incident rays are traced as a bright-dark lattice for simplicity. In this case, the rays are incident on a partial are of the focusing panel.

Let us assume, for example, that this partial area corresponds to eight micro lenses shown in FIG. 30. In this case, a brightness distributed is produced on a screen as shown in FIG. 31. In FIG. 28, bright portions are emphasized. A brightness distribution is therefore shown discretely as bright spots. However, brightness at a certain degree is present even among the bright spots. A brightness distribution formed by the bright spots is referred to as a diffusion pattern.

In a diffusion pattern shown in FIG. 31, bright areas (four bright spots located on right and left sides of three bright spots) are present around central portions (three bright spots in a vertical direction). Dark areas are present around these bright spots and bright spots are further present around the dark area. In other words, the diffusion patterns shown in FIG. 31 have a ring-like configuration. Accordingly, the focusing panel shown in FIG. 30 has is tends to blur an image of an object likes a dualized image.

Let us further assume that the partial area on which rays are incident corresponds to eight hexagonal micro lenses shown in FIG. 32. In this case, a brightness distribution is produced on the screen as shown in FIG. 33. Bright portions are emphasized also in FIG. 33. The brightness distribution is therefore shown discretely as bright spots. However, brightness at a certain degree is present even among the bright spots.

A diffusion pattern shown in FIG. 33 has bright ring shaped portions at locations a little apart from central portions. A focusing panel shown in FIG. 32 therefore provides unnatural blur like the focusing panel shown in FIG. 30.

An outer circumferential shape of a diffusion area which is rotationally asymmetrical with regard to a center is traced by connecting bright spots positioned at outermost locations. Triangular protruding areas are produced in an oblique direction in particular. Accordingly, blurred conditions of an image of an object may be different between a right-left direction and the oblique direction on a screen when the object is out of focus.

Furthermore, there is a conventional example which uses a irregular combination of lattice pitches like the focusing panel disclosed by Japanese Patent Kokai Publication No. 2000 321626. This conventional example is a focusing panel (diffuser panel) which has a random pattern. In this example, diffused rays are brightened by using three types of elements which have different heights.

However, it is not easy to manufacture this focusing panel (diffuser panel) since the panel requires forming random patterns on an entire surface. Furthermore, a diffraction grating has a rectangular shape, thereby allowing diffracted rays on high orders to produce flare on an entire screen.

The conventional diffuser panels which use the micro lenses are improved in brightness as compared with the diffuser panels composed of the sand-blasted surfaces as described above. However, the diffuser panel using the micro lenses provides diffused rays having a ring-like pattern or a diffusion area which is rotationally asymmetrical. Accordingly, this diffuser panel provides an unnaturally blurred image of an object which is out of focus when the diffuser panel is used as a focusing panel of an optical apparatus.

SUMMARY OF THE INVENTION

An object of the present invention is to provide a diffuser panel which can be manufactured easily and forms a diffusion pattern which gently changes in a predetermined diffusion area. Furthermore, the present invention provides a diffuser panel which produces an image which is naturally blurred and has high brightness when the diffuser panel is used as a focusing panel.

A diffuser panel according to the present invention uses a plurality of micro lenses which are arranged on a surface of a substrate: a half or more of the plurality of the micro lenses having an outer circumferential shape which has (2n+1) angles, where n is an integer of 2 or larger.

Another diffuser panel according to the present invention has a plurality of micro lenses which are arranged on a surface of a substrate: a half or more of the plurality of the micro lenses having an outer circumferential shape which has (2n+1) angles and a plurality of areas in a shape having m angles existing among the outer circumferential shapes, where n is an integer of 2 or larger and m is an integer of 3 or larger.

Furthermore, another diffuser panel according to the present invention has a plurality of polygonal micro lenses arranged on a surface. The micro lenses are arranged so as to include at least one polygonal side which does not intersect orthogonally with a line connecting vertices of the micro lenses.

Moreover, another diffuser panel according to the present invention has a plurality of polygonal micro lenses arranged on a surface. The micro lenses are arranged so that a line connecting vertices of a micro lens and an adjacent micro lens is not identical to a line connecting vertices of the micro lens and another adjacent micro lens.

Furthermore, a focusing panel for an image pickup device according to the present invention uses the above described diffuser panel according to the present invention.

Furthermore, an optical apparatus according to the present invention uses the above described diffuser panel according to the present invention.

DETAILED DESCRIPTION OF THE PREFERRED EMBODIMENTS

The diffuser panel according to the present invention has a plurality of micro lenses which are arranged on one surface. A half or more of these micro lenses have an outer circumferential shape which has (2n+1) angles, where n is an integer of 2 or larger.

Figure 34:
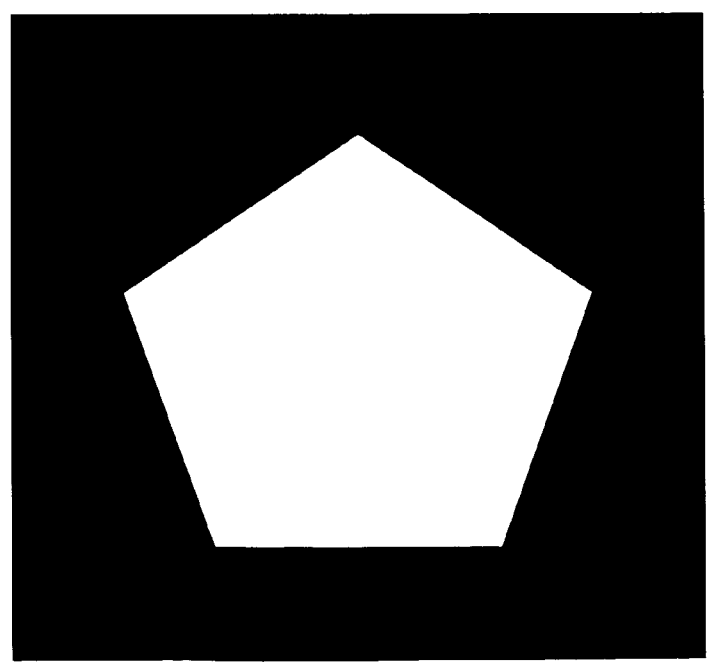
FIG. 34 is diagram showing a case where an aperture according to the present invention has a pentagonal shape.
Figure 35:
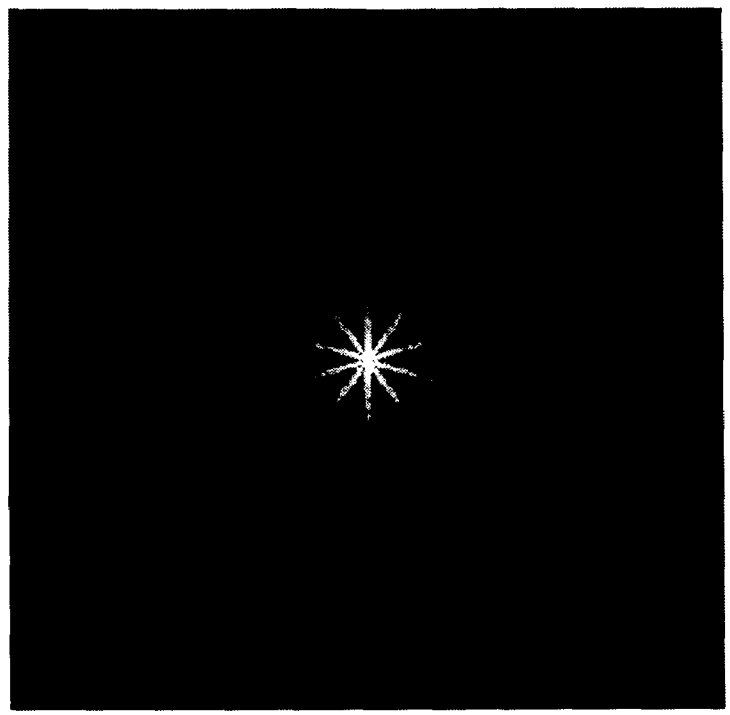
FIG. 35 is a diagram showing a diffraction pattern of the aperture according to the present invention shown in FIG. 34.

Description will be made of a case where an outer circumferential shape of the micro lenses has angles in a number of n=2 out of shapes having the (2n+1) angles. When n=2, the micro lenses have a pentagonal outer circumferential shape. Using a pentagonal aperture, description will be made of an optical characteristic of the pentagonal micro lenses. FIG. 34 shows a pentagonal aperture. Furthermore, FIG. 35 shows a diffraction image which is produced by the pentagonal aperture. This diffraction image has ten bright areas in total in directions corresponding to sides and angles of the aperture as seen from the diffraction image shown in FIG. 35.

Figure 36:
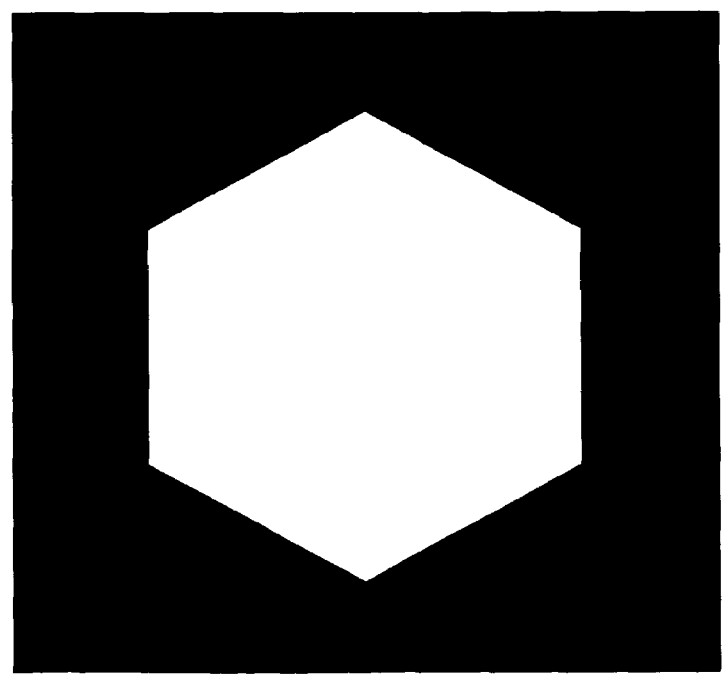
FIG. 36 is a diagram showing a case where the aperture according to the present invention has a hexagonal shape.
Figure 37:
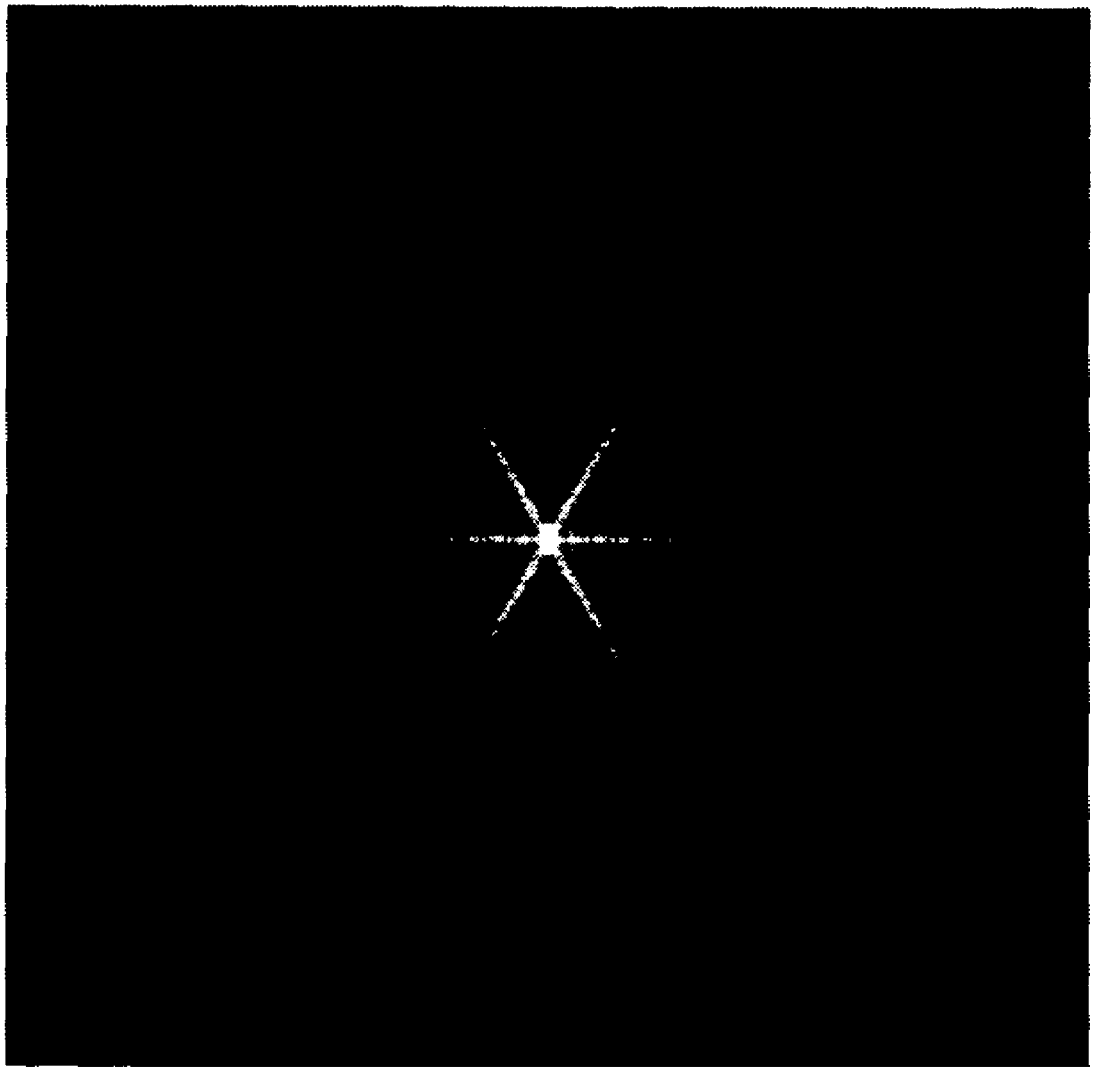
FIG. 37 is a diagram showing a diffraction pattern of the diffuser panel according to the present invention which has the aperture shown in FIG. 36.

A case of an aperture which has 2n angles is shown for comparison. FIG. 36 shows a hexagonal aperture. Furthermore, FIG. 37 shows a diffraction image produced by this hexagonal aperture. As seen from the diffraction image shown in FIG. 37, the diffraction image has six bright areas in directions corresponding to sides.

The pentagonal aperture produces the bright areas in more directions than the hexagonal aperture as described above. In other words, the pentagonal aperture can scatter the bright areas in more directions. When a diffuser panel is to be composed of micro lenses having polygonal outer circumferential shapes, micro lenses which have a pentagonal outer circumferential shape therefore form bright areas more hardly in a specific direction than micro lenses which have a hexagonal outer circumferential shape. This means that an external shape in a diffusion becomes a shape which is substantially rotationally symmetrical.

In a case where ten bright areas are to be produced on a diffraction image with the aperture in the shape having 2n angles, the aperture must have a decagonal shape. In this case, not only a number of sides is increased but also an angle formed by sides which are adjacent to each other is enlarged. Accordingly, it is difficult to form such an outer circumferential shape small and precisely on a substrate.

In case of the aperture having the pentagonal shape, in contrast, the aperture has an external shape which is simpler than that of the decagonal aperture. The pentagonal aperture can therefore be formed easier on a substrate. Furthermore, an angle formed by adjacent sides is acuter. Accordingly, an angle error is smaller when micro lenses are formed on the substrate. These merits make it possible to manufacture a diffuser panel easier and more precisely.

Furthermore, the diffuser panel according to the present invention forms the external shape which is substantially rotationally symmetrical in the diffusion area as described above. Accordingly, the diffuser panel according to the present invention which is used as a focusing panel blurry an image of an object at degrees which are less different dependently on directions when the object is out of focus. That is, the diffuser panel according to the present invention reduces unnatural blurring of an image, thereby providing more natural blurring.

It is preferable for the diffuser panel according to the present invention to adopt $1<n\leq 4$ as a value of the above mentioned n. Such a value makes it possible to produce bright areas in more directions with a simple outer circumferential shape. Accordingly, it is possible to manufacture easily a diffuser panel which produces an external shape substantially more rotationally symmetrical in a diffusion area.

Furthermore, it is allowed for the diffuser panel according to the present invention to have areas in a shape having m angles among the micro lenses in the shape having the (2n+1) angles. It is preferable for the area in the shape having the m angles to have an area smaller than that of the micro lens in the shape having the (2n+1) angles. Even when the areas in the shape having the m angles are transparent planar surfaces, light amount is reduced extremely little since the areas in the shape having the m angles are narrow relative to an area of the diffuser panel as a whole.

Furthermore, the areas in the shape having the m angles may be planar surfaces and sand-blasted. The areas in the shape having the m angles which are sand-blasted can diffuse incident rays more effectively. In this case, a smaller amount of the incident rays fall on a pupil of an a observer while observing an image. However, the areas in the shape having the m angle little reduces a light amount since the areas in the shape having the m angle are fewer than the micro lenses in the shape having the (2n+1) angles. Accordingly, an image is not darkened so remarkably.

Furthermore, the areas in the shape having the m angles may be configured as micro lenses. When the areas in the shape having the m angles are configured as micro lenses, the incident rays can be diffused at a high efficiency.

Furthermore, it is allowed to configure the areas in the shape having the m angles and the micro lenses in the shape having the (2n+1) angles so as to have different shapes. Such a configuration prevents diffracted rays from being strengthened by one another and reduces concentration of bright spots.

Furthermore, it is possible to compose the diffuser panel according to the present invention of two kinds of micro lenses which have vertices at different heights. When the diffuser panel according to the present invention is composed of such two kinds of micro lenses, diffusion patterns of the micro lenses having the different heights are overlapped. As a result, the diffuser panel can provide a pattern which changes brightness more smoothly from a center toward a margin.

In addition, it is not preferable to use three or more kinds of micro lenses, which will complicate design and manufacturing steps.

At a stage to arrange the two kinds of micro lenses having the vertices at the different heights, an arrangement pattern for a kinds of micro lenses may be different from an arrangement pattern for the other kind of micro lenses. A desired diffusion pattern can be obtained easily by selecting different arrangement patterns for the two kinds of micro lenses.

Furthermore, it is allowed to group a plurality of micro lenses into a block (unit) and arrange such a block periodically. Alternately, it is allowed to group a plurality of micro lenses and a plurality of areas into a block (unit), and arrange such a block periodically. Such grouping and arrangement will facilitate to manufacture a diffuser panel. The grouping and arrangement will make it possible to manufacture a diffuser panel at a low cost and with a high precision in particular when a diffuser panel is manufactured by a method described later.

In addition, a block is to comprise the two kinds of micro lenses having the vertices at the different heights when the diffuser panel has a composition using the two kinds of micro lenses. In this case, the two kinds of micro lenses are arranged in an identical pattern. Such a composition will make it possible to manufacture the diffuser panel easily. In particular, such a composition will make it possible to manufacture the diffuser panel at a low cost and with a high precision when the diffuser panel is manufactured by a method described later.

Furthermore, another diffuser panel according to the present invention is composed of polygonal micro lenses which are arranged so that straight lines connecting vertices of the micro lenses will not intersect orthogonally with sides of the micro lenses. In a case where the polygonal micro lenses are arranged adjacent to one another, sides of adjacent portions intersect orthogonally with the straight lines mentioned above. Therefore, the sides of the adjacent portions are not included in the sides of the micro lenses.

Such a configuration makes it possible to prevent polygons in the same shape from being arranged periodically. Accordingly, this configuration provides an outer circumferential shape of a diffusion area which is more rotationally symmetrical.

Furthermore, still another diffuser panel according to the present invention is composed of a plurality of micro lenses and has a configuration in which a first micro lens is adjacent to a second micro lens, the second micro lens is adjacent to a third micro lens, and the first through third micro lenses are arranged so that a straight line connecting a vertex of the first micro lens to a vertex of these second micro lens will not be coincident with a straight line connecting the vertex of the second micro lens to a vertex of the third micro lens.

By adopting a configuration such as that described above, it is possible in moderate concentration of bright areas in a specific direction. In other words, this configuration provides an outer circumferential shape of a diffusion area which is more rotationally symmetrical.

In addition, it is allowed also for these other diffuser panels to group a plurality of micro lenses into a block (unit) and arrange such a block periodically. Such grouping and arrangement will make it possible to manufacture the diffuser panel easily. In particular, the grouping and arrangement will make it possible to manufacture the diffuser panel at a low cost and with a high precision when the diffuser panel is manufactured by the method which is described later.

It is desirable for the diffuser panel described above that the vertex of the micro lens has a height not lower than 0.6 μm and not higher than 7 μm.

When the vertices of the two kinds of micro lenses have different heights, it is preferable to select h1/h2 within a range defined below:

$$1.5 < h1/h2 < 3$$

wherein a reference symbol h1 represents a height of a vertex of a first kind of micro lens and a reference symbol h2 designates a height of a vertex of a second kinds of micro lens.

If it becomes lower than a lower limit of 1.5, there will be no difference between diffusion patterns produced by the two heights. If an upper limit of 3 is exceeded, on the other hand, there will be a large difference between positions at which brightness is maximum on diffusion patterns of the two heights. As a result, a ring-like dark portion will easily be produced on a diffusion pattern as a whole.

Furthermore, it is desirable to reserve a distance not shorter than 3 μm and not longer than 30 μm between the vertices of the micro lenses.

A distance shorter than 3 μm between the vertices of the micro lenses is not be preferable from a viewpoint of a diffusion characteristic. Furthermore, a distance longer than 30 μm between the above described vertices will make it difficult to manufacture the diffuser panel.

Furthermore, a distance of 5 μm or longer between the vertices of the micro lenses is preferable from viewpoints of the diffusion characteristic and the like, and a distance of 10 μm or longer is more preferable. Furthermore, a distance not longer than 25 μm between the vertices is more preferable from a viewpoint of manufacturing of the diffuser panel.

Furthermore, the diffuser panel according to the present invention may have a Fresnel surface on a side opposite to a diffusing surface. By using this Fresnel surface a condenser lens, it is possible to select an adequate location of a pupil easily in designing an optical system, thereby enhancing optical performance such as a brightness distribution from a center to a margin.

Furthermore, an optical apparatus according to the present invention has the above described diffuser panel. In a case where the optical apparatus is an image pickup apparatus, for example, a single-lens reflex camera, the apparatus is equipped with the above described diffuser panel as a focusing panel.

Now, description will be made of embodiments of the present invention on the basis of the accompanying drawings.

Figure 1:
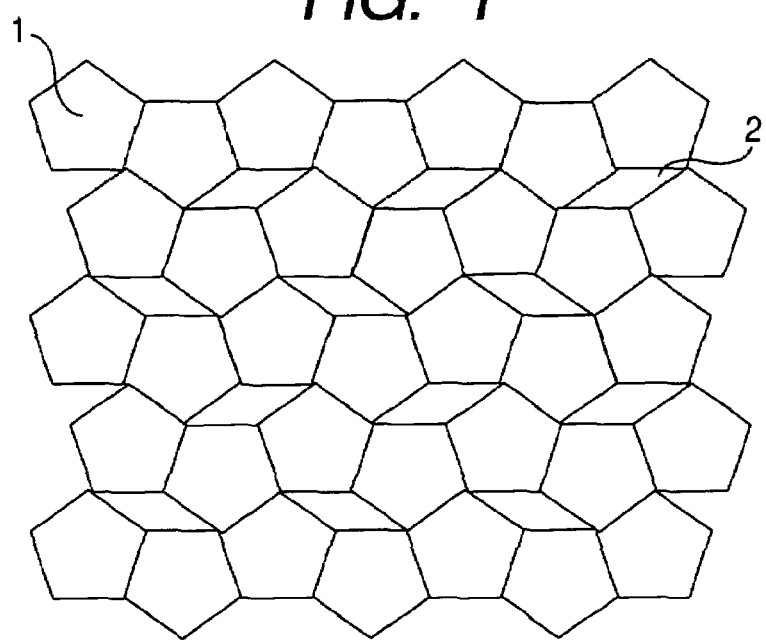
FIG. 1 is a diagram showing a pattern of micro lenses on a diffuser panel according to a first embodiment of the present invention.

FIG. 1 is a diagram showing a first embodiment of the present invention. A diffuser panel according to the first embodiment is an example where n=2 and m=4. The diffuser panel according to the first embodiment has substantially pentagonal micro lenses 1 which are formed on a surface of the diffuser panel. The micro lenses 1 are arranged so that the micro lenses are in contact with one another on a side of each pentagonal shape. Furthermore, the micro lenses 1 are arranged so that rectangular areas 2 are formed among the micro lenses 1.

Furthermore, the micro lenses 1 are arranged periodically as shown in FIG. 1. The rectangular area 2 has a sand-blasted surface which has random shapes formed on a planar surface for enhancing a diffusing property.

The micro lens 1 shown in FIG. 1 has an outer circumferential shape of a regular pentagon which has a side 12.4 μm long. Furthermore, a vertex is 2.5 μm high. Furthermore, the rectangular area is a random sand-blasted surface which has a height of 0.05 to 1 μm and an average roughness of 0.125 μm. Furthermore, a surface shape has a random pattern.

Figure 2:
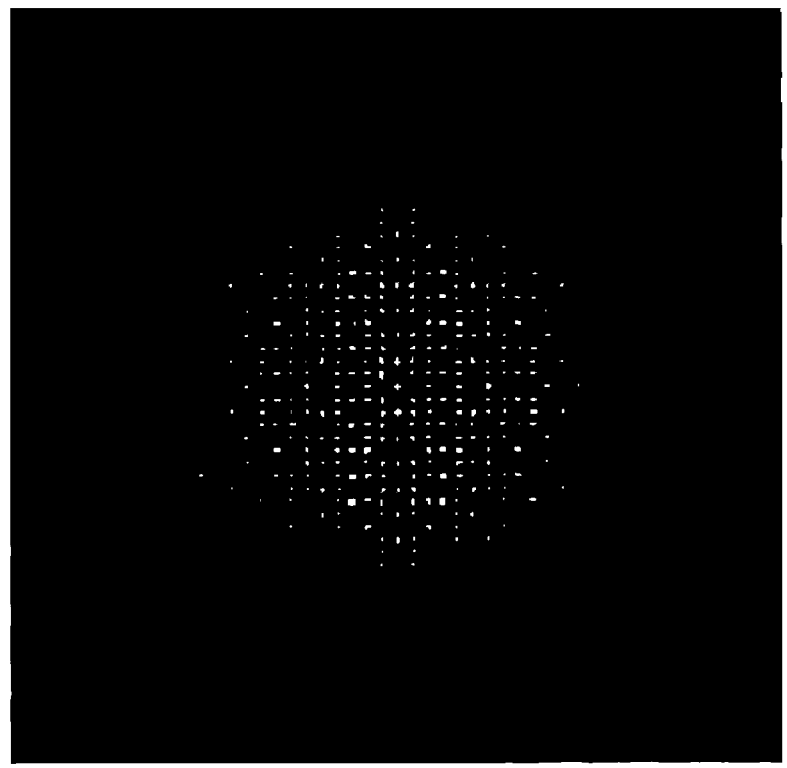
FIG. 2 is a diagram showing a diffusion pattern of the diffuser panel according to the first embodiment of the present invention.

A diffusion pattern obtained with the diffuser panel according to the first embodiment is illustrated in FIG. 2. On the diffusion pattern of the diffuser panel according to the first embodiment, brightness changes gently from a center toward a margin as illustrated in FIG. 2. In other words, no ring-like bright portion or dark portion exists in the course of the pattern. Furthermore, a diffusion area has an outer circumferential shape which has no remarkable angle and is substantially rotationally symmetrical.

Accordingly, the diffuser panel according to the first embodiment is usable as a focusing panel which reduces a cause for unnatural blur.

Figure 3:
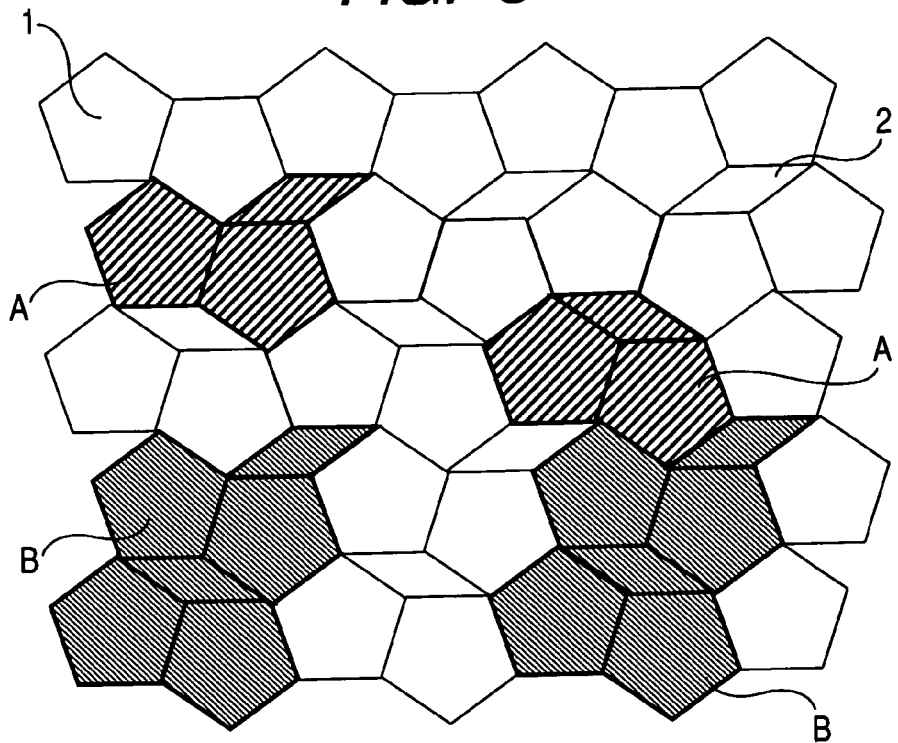
FIG. 3 is a diagram showing a condition where the micro lenses are arranged periodically on the diffuser panel according to the first embodiment of the present invention.

Furthermore, when a single block A is assumed to be composed of two micro lenses 1 and a rectangular area 2 as shown in FIG. 3, the diffuser panel is composed of such blocks. In this case, the micro lenses 1 of the block A occupy a ratio of ⅔ of the block A as a whole. Accordingly, the pentagonal micro lenses 1 occupy a half or more number of a total micro lenses of the diffuser panel according to the first embodiment even when the rectangular areas 2 are micro lenses.

Furthermore, when a single block B is assumed to be composed of four micro lenses 1 and two rectangular areas 2, the diffuser panel is composed of such blocks. In this case, the block B is arranged periodically.

Figure 4:
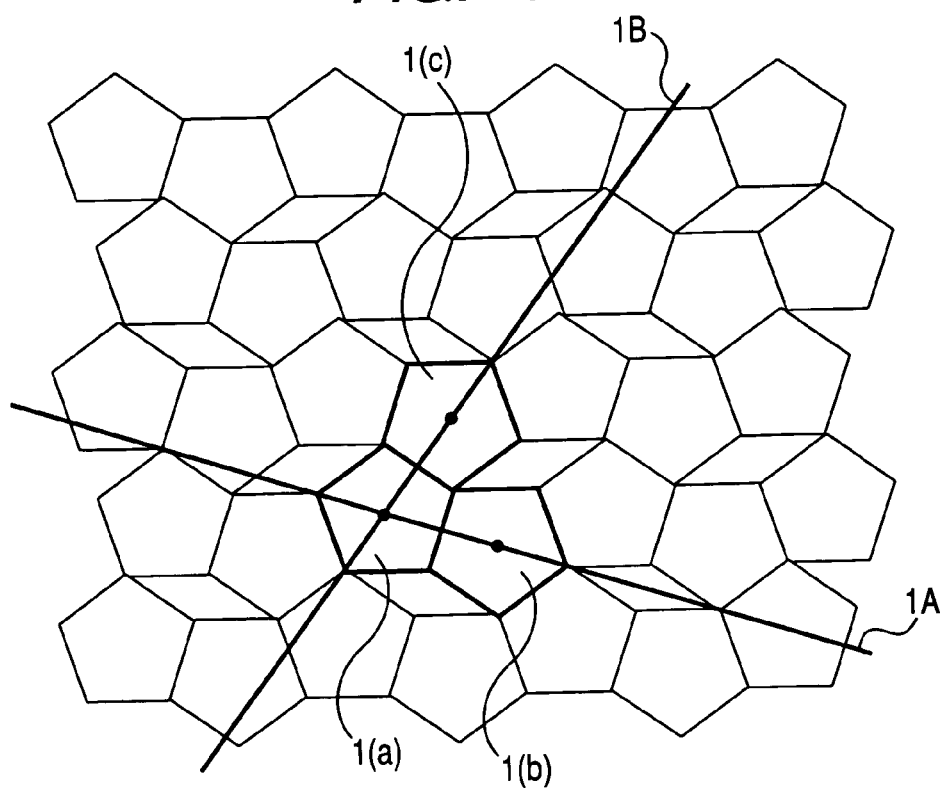
FIG. 4 is a diagram showing a relation between lines connecting vertices of the micro lenses and an outer circumferential shape of the micro lenses on the diffuser panel according to the first embodiment of the present invention.

Furthermore, a line 1A connecting vertex of a micro lens 1(a) to that of an adjacent micro lens 1(b) is not coincident with a line 1B connecting the vertex of the micro lens 1(a) to a vertex of another adjacent micro lens 1(c) in contact with the micro lens 1(a) on another side as shown in FIG. 4.

Figure 5:
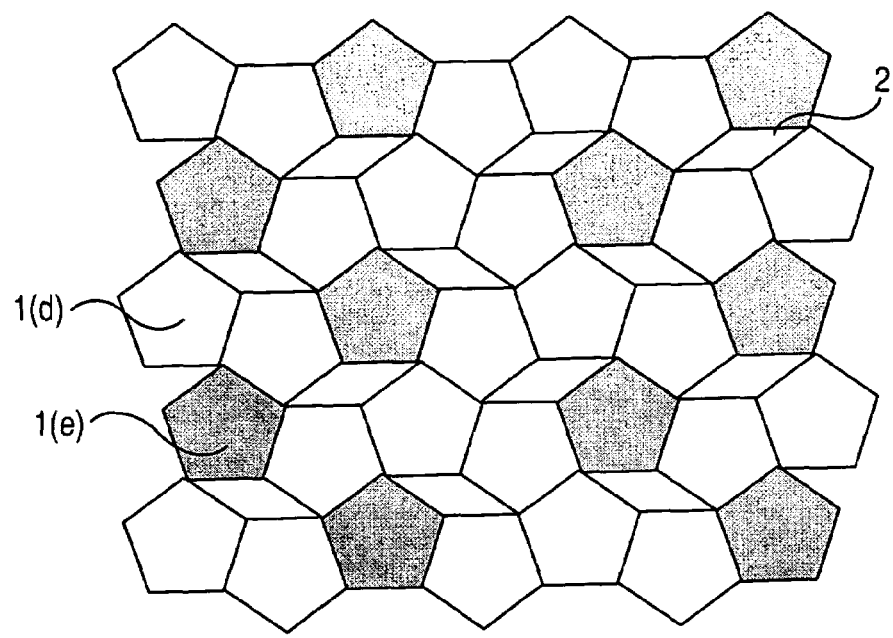
FIG. 5 is a diagram showing a patterns of micro lenses on a diffuser panel according to a second embodiment of the present invention.

A second embodiment of the present invention is illustrated in FIG. 5. Like the diffuser panel according to the first embodiment, a diffuser panel according to the second embodiment is also an example where n=2 and m=4. Substantially pentagonal micro lenses 1(d) and 1(e) are formed also on a surface of the diffuser panel according to the second embodiment. Micro lenses 1 are arranged so that the micro lenses are in contact with one another on a side of each pentagon. Furthermore, the micro lenses 1 are arranged to as to form rectangular areas 2 among the micro lenses 1.

The diffuser panel according to the second embodiment has two kinds of micro lenses 1(d) and 1(e) which have different heights. Furthermore, the micro lenses 1(d) and 1(e) are arranged periodically respectively. Furthermore, the rectangular areas 2 are also composed of micro lenses.

The micro lens 1(d) has a side 12.4 μm long and a height of 2.5 μm. The micro lens 1(e) has a side 12.3 μm long and a height of 1.3 μm. Furthermore, the rectangular area 2 is 2.5 μm high.

Figure 6:
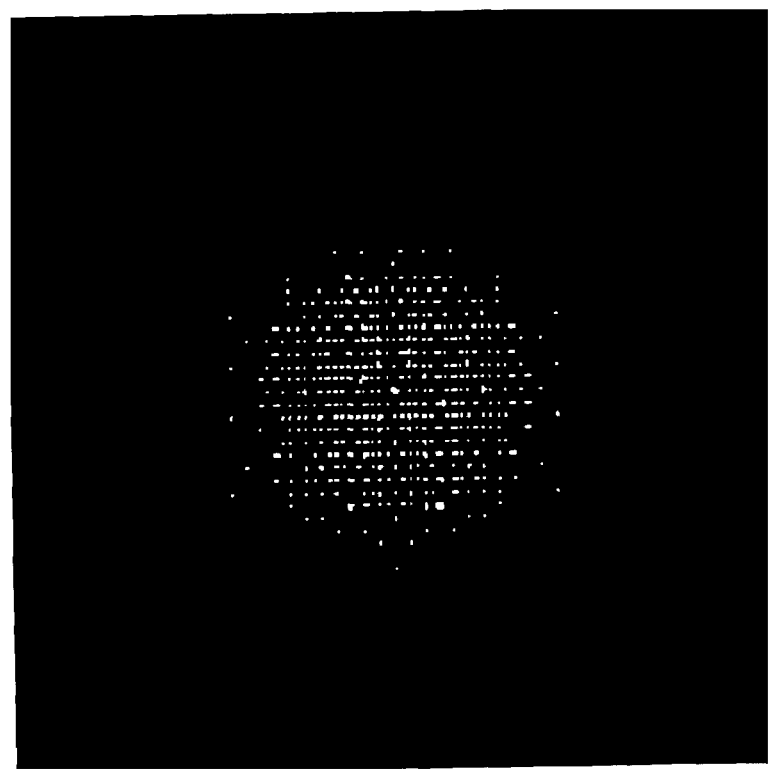
FIG. 6 is a diagram showing a diffusion pattern of the diffuser panel according to the second embodiment of the present invention.

A diffusion pattern obtained with the diffuser panel according to the second embodiment is illustrated in FIG. 6. Since the rectangular area 2 is the micro lens, the diffuser panel according to the second embodiment increases a light amount in the vicinity of a center as compared with the diffuser panel according to the first embodiment. Furthermore, a diffusion area of the diffuser panel according to the second embodiment has an outer circumferential shape which is free from a remarkable angle and substantially rotationally symmetrical.

Furthermore, two kinds of micro lenses having the different heights are combined in the second embodiment. Accordingly, different periodicities of the two kinds of micro lenses are overlapped with each other, whereby brightness changes gently from a center toward a margin. In other words, no ring-like bright portion or dark portion exists in the course of diffusion pattern.

Accordingly, the diffuser panel according to the second embodiment reduces a cause for unnatural blur when the diffuser panel is used as a focusing panel. The diffuser panel according to the second embodiment is sufficiently usable as a focusing panel.

Figure 7:
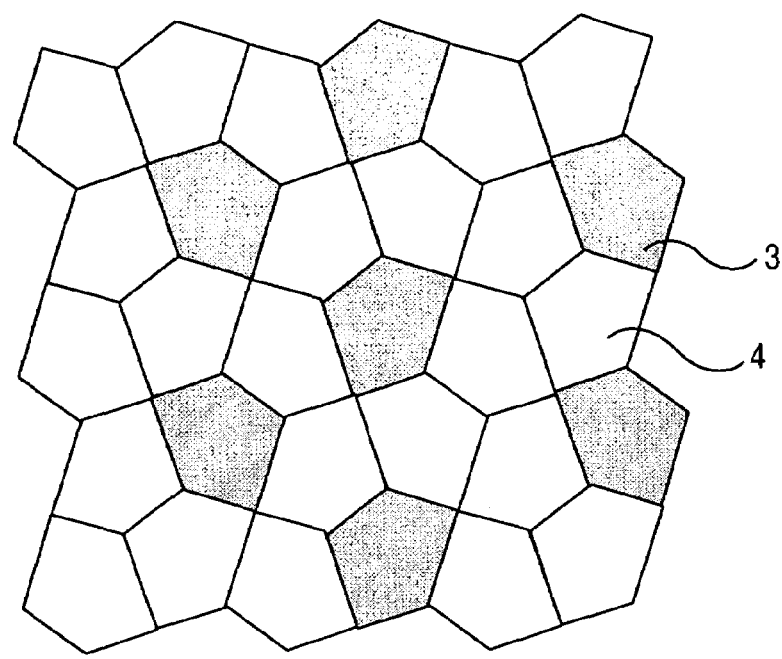
FIG. 7 is a diagram showing a pattern of micro lenses on a diffuser panel according to a third embodiment of the present invention.

Then, a diffuser panel according to a third embodiment of the present invention is illustrated in FIG. 7. The third embodiment is an example where n=2 and m=0. In other words, the diffuser panel according to the third embodiment consists only of pentagonal micro lenses. In the third embodiment, an outer circumferential shape of the micro lens is not regular pentagon. Furthermore, the diffuser panel according to the third embodiment has two kinds of micro lenses 3 and 4 which have different heights. The micro lenses 3 and the micro lenses 4 are arranged periodically respectively.

The micro lens 3 of the diffuser panel according to the third embodiment has a side 13.5 to 18.6 μm long. The micro lens 3 has a vertex 2.5 μm high and the micro lens 4 has a vertex 1.3 μm high.

Figure 8:
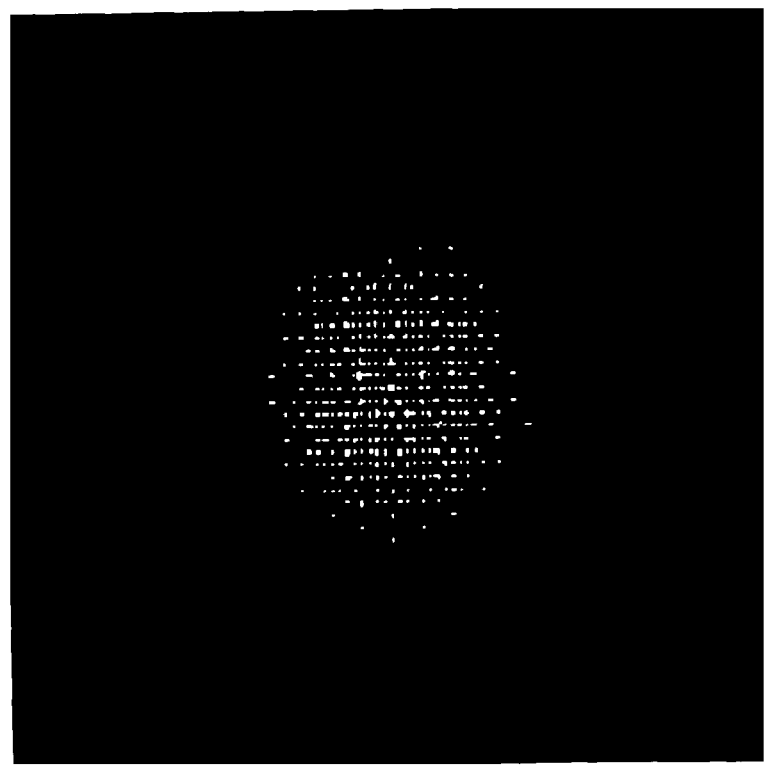
FIG. 8 is a diagram showing a diffusion pattern of the diffuser panel according to the third embodiment of the present invention.
Figure 9:
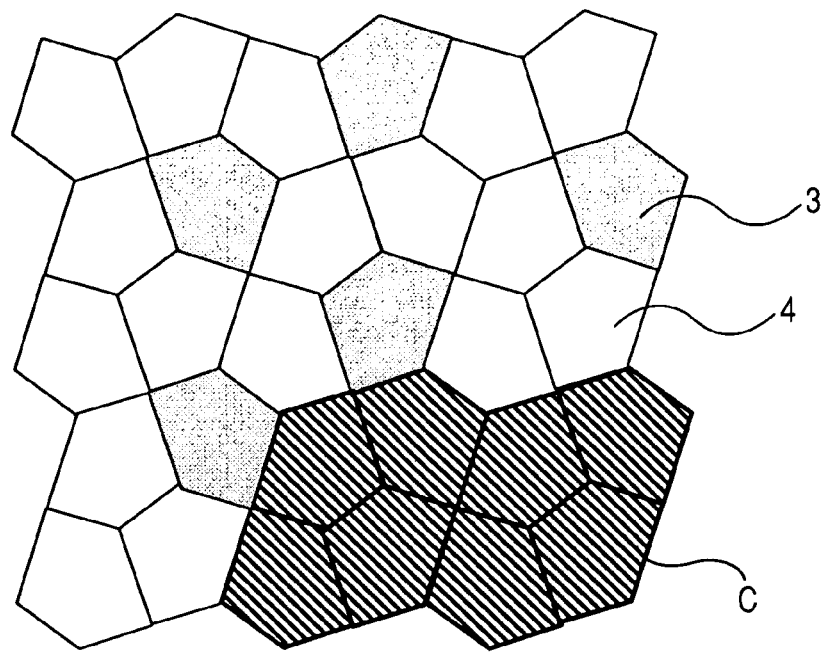
FIG. 9 is a diagram showing a condition where the micro lenses are arranged periodically on the diffuser panel according to the third embodiment of the present invention.

Furthermore, the diffuser panel according to the third embodiment provides a diffusion pattern shown in FIG. 8. Brightness changes gently from a center toward a margin also on a diffusion pattern of the diffuser panel according to the third embodiment. In other words, no ring-like bright portion or dark portion exists in the course of this diffusion pattern. Furthermore, a diffusion area has an outer circumferential shape which has no remarkable angle and is substantially rotationally symmetrical.

Furthermore, the diffuser panel according to the third embodiment consists only of the pentagonal micro lenses. This diffuser panel is therefore a bright diffuser panel.

Furthermore, when a block C is assumed to be composed of two micro lenses 3 and six micro lenses 4, the block C is arranged periodically.

Figure 10:
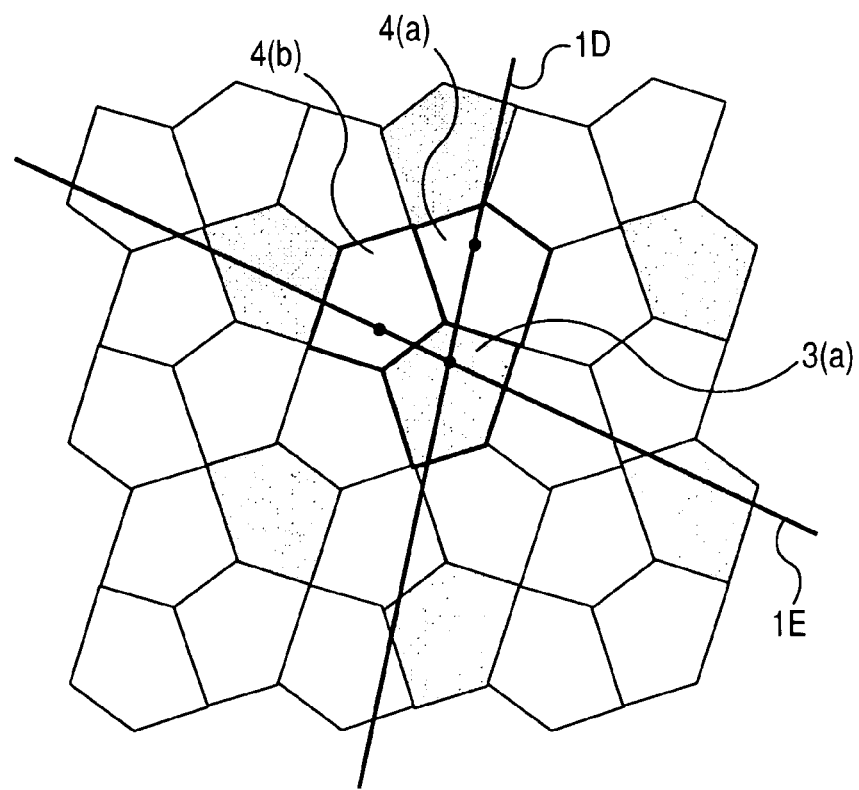
FIG. 10 is a diagram showing a relation between lines connecting vertices of the micro lenses and an outer circumferential shape of the micro lenses on the diffuser panel according to the third embodiment of the present invention.

On the diffuser panel according to the third embodiment, a line 1D which connects a vertex of a micro lens 3(*a*) to a vertex of a micro lens 4(*a*) does not intersect orthogonally with a side, except for those which are in contact with each other as shown in FIG. 10. Furthermore, the line 1D connecting the vertices of the micro lens 3(*a*) to the vertex of the adjacent micro lens 4(*a*) is not coincident with a line 1R which connects the vertex of the micro lens 3(*a*) to a vertex of another adjacent micro lens 4(*b*).

Figure 11:
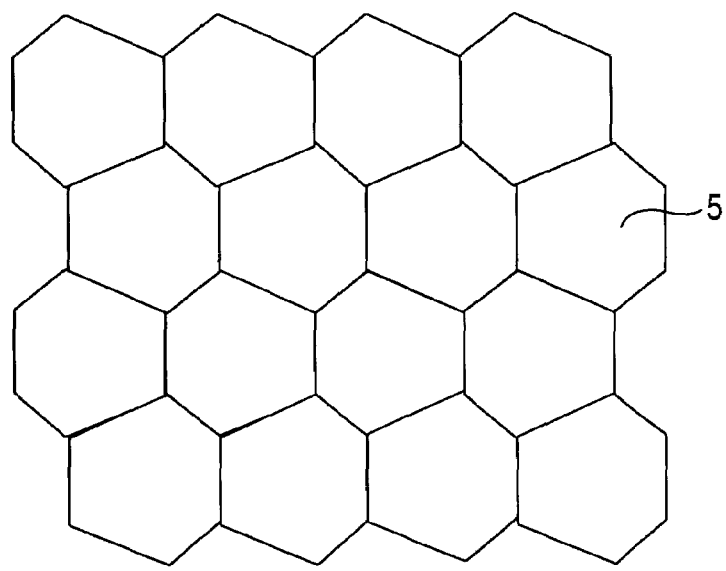
FIG. 11 is a diagram showing a pattern of micro lenses on a diffuser panel according to a fourth embodiment of the present invention.

A diffuser panel according to a fourth embodiment of the present invention is illustrated in FIG. 11. Different from other embodiments, the fourth embodiment uses micro lenses 5 in a shape which has 2n angles in place of the shape having the (2n+1) angles. In the fourth embodiment, the micro lenses 5 are in a hexagonal shape.

Figure 12:
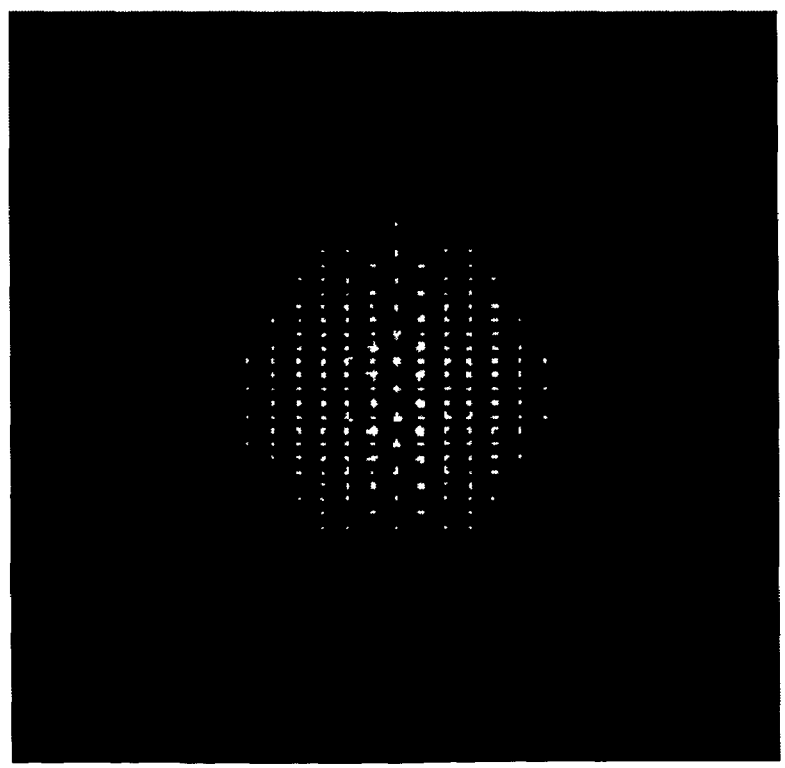
FIG. 12 is a diagram showing a diffusion pattern according to the fourth embodiment of the present invention.

The diffuser panel according to the fourth embodiment has a diffusion pattern shown in FIG. 12. A diffusion area has an outer circumferential shape which is rather close to a polygon. However, the outer circumferential shape has no triangular protruding area unlike a regular hexagon shown in FIG. 12. Furthermore, brightness gently changes from a center toward a margin. In other words, no ring-like bright portion or dark portion exists in the course of the diffusion pattern.

Though the diffuser panel according to the fourth embodiment use the hexagonal micro lenses (having 2n angles), this panel provides the diffusion pattern which has moderated angles and is free from a ring, thereby reducing a cause for unnatural blur.

Figure 13:
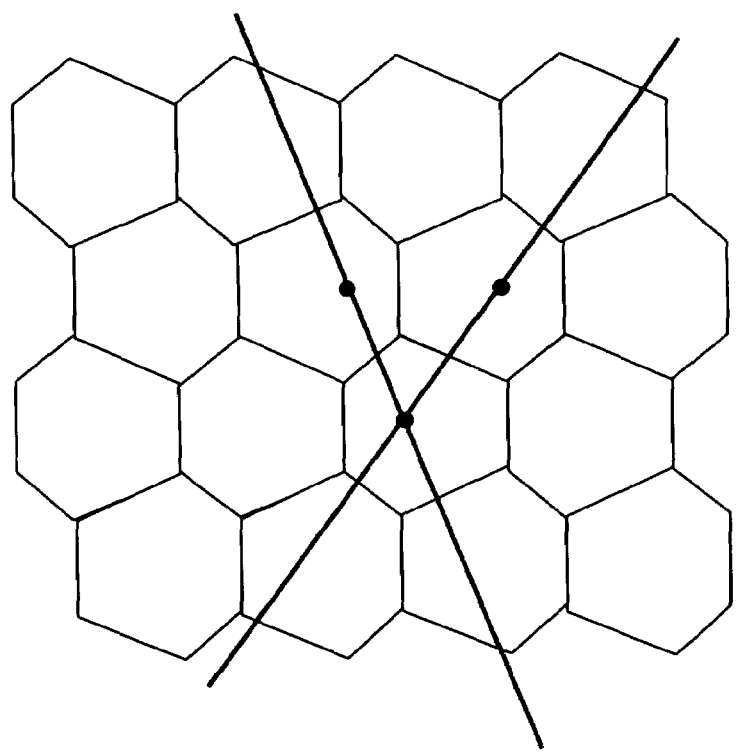
FIG. 13 is a diagram showing a relation between lines connecting vertices of the micro lenses and an outer circumferential shape of the micro lenses.

Furthermore, lines which connect vertices of the micro lenses do not intersect orthogonally with sides of the polygons (hexagons) (except for sides which are in contact with one another) as shown in FIG. 13. Furthermore, the diffuser panel is configured so that a straight line which connect a vertex of a micro lens to an adjacent micro lens is not coincident with a line which connects the vartex of the former micro lens to a vertex of another adjacent micro lens.

FIGS. 14 through 20 are diagrams showing diffuser panels according to the present invention which have other configurations.

Figure 14:
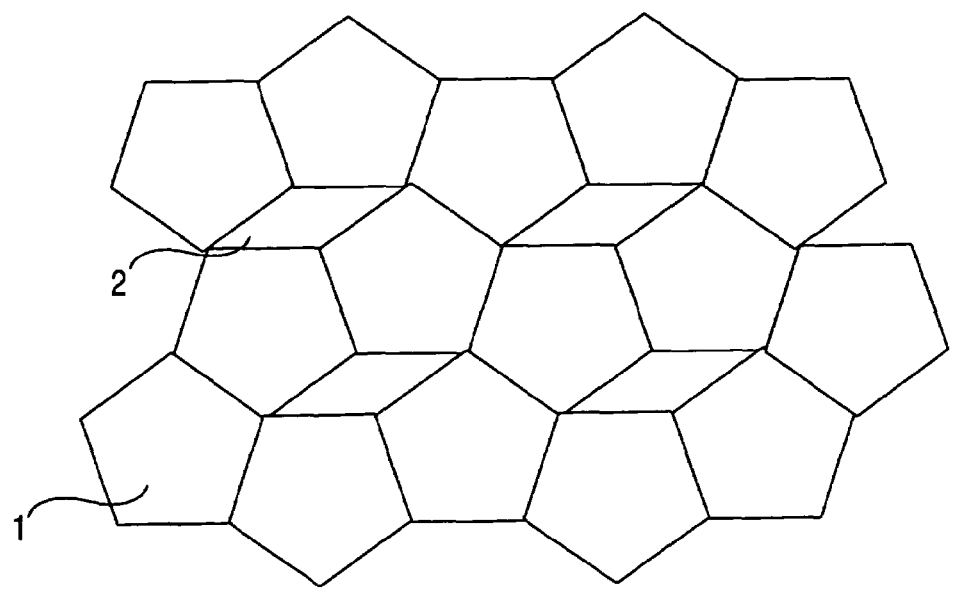
FIG. 14 is a diagram showing a pattern of micro lenses according to a fifth embodiment of the present invention.

Out of these diffuser panels, a micro lens which is shown in FIG. 14 has a configuration where n=2 and m=4 as in the first embodiment. Speaking concretely, the diffuser panel shown in FIG. 14 has a configuration where micro lenses 1 which have a pentagonal outer circumferential shape are combined with rectangular areas 2. However, arrangement of the micro lenses 1 and the rectangular areas is a little different from that in the first embodiment.

Figure 15:
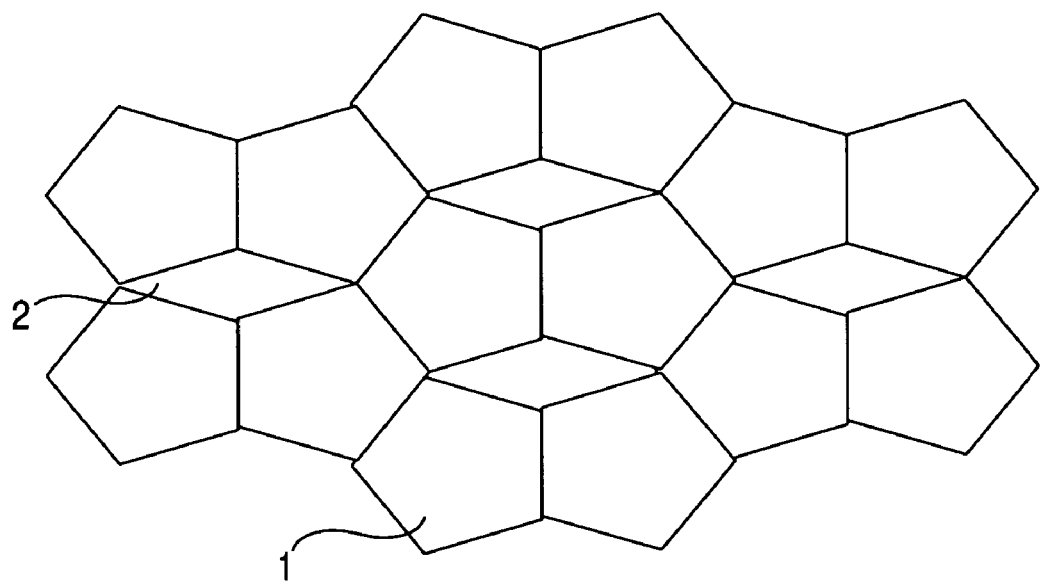
FIG. 15 is a diagram showing a patterns of micro lenses according to a sixth embodiment of the present invention.

A diffuser panel shown in FIG. 15 has a configuration where n=2 and m=4 as in the first embodiment. However, arrangements of micro lenses 1 and rectangular areas 2 are different from either of those on the diffuser panel according to the first embodiment or the diffuser panel shown in FIG. 14.

Figure 16:
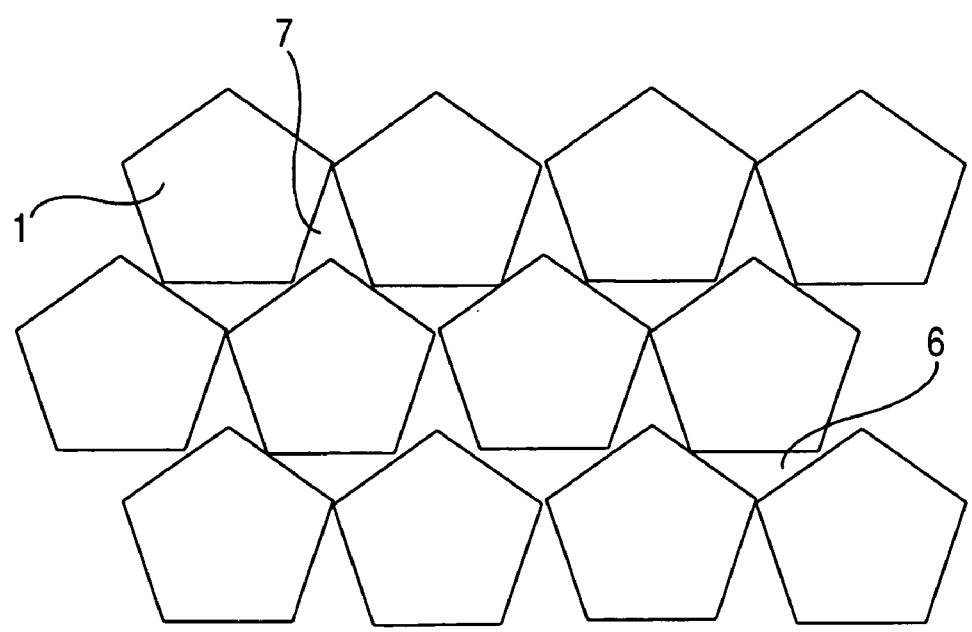
FIG. 16 is a diagram showing a pattern of micro lenses according to a seventh embodiment of the present invention.

A diffuser panel shown in FIG. 16 is an example where n=2, m=3, m=4. In other words, the diffuser panel is an example where pentagonal micro lenses 1, triangular areas 6 and rectangular areas 7 are mixed and arranged respectively.

Figure 17:
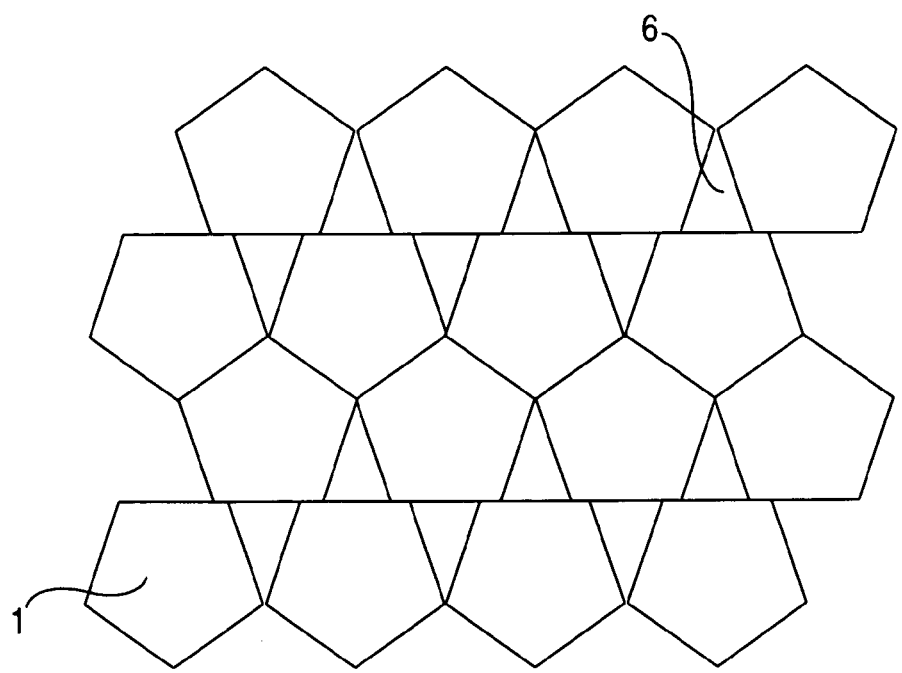
FIG. 17 is a diagram showing a pattern of micro lenses according to an eighth embodiment of the present invention.

A diffuser panel shown in FIG. 17 adopts n=2 and m=3, and consists of pentagonal micro lenses 1 and triangular areas 6.

Figure 18:
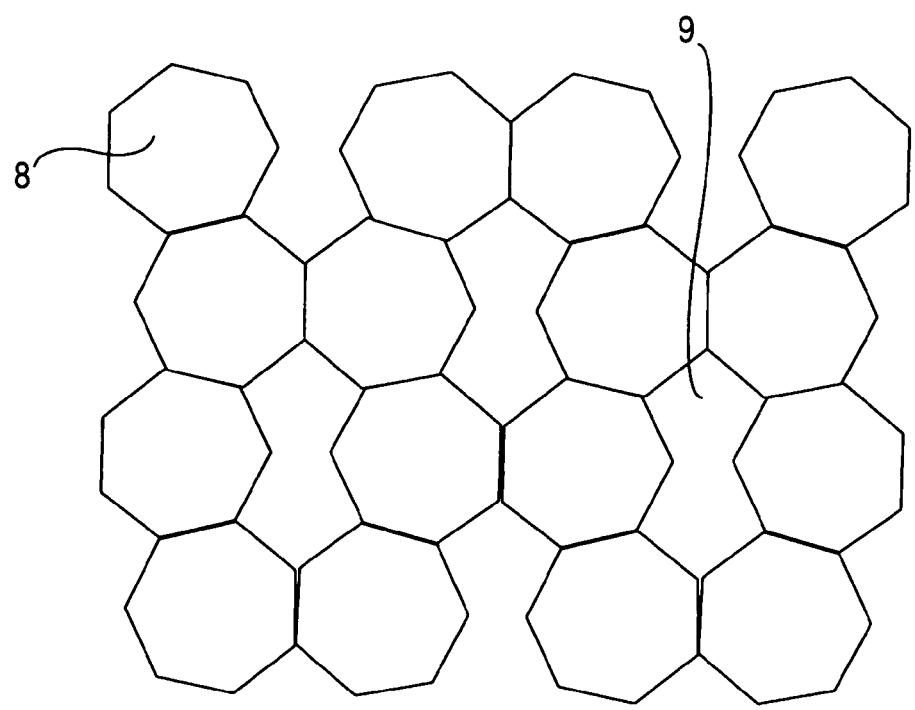
FIG. 18 is a diagram showing a pattern of micro lenses according to a ninth embodiment of the present invention.

A diffuser panel shown in FIG. 18 is an example where n=2 and m=8. In other words, this diffuser panel is composed of heptagonal micro lenses 8 and octagonal areas 9.

Figure 19:
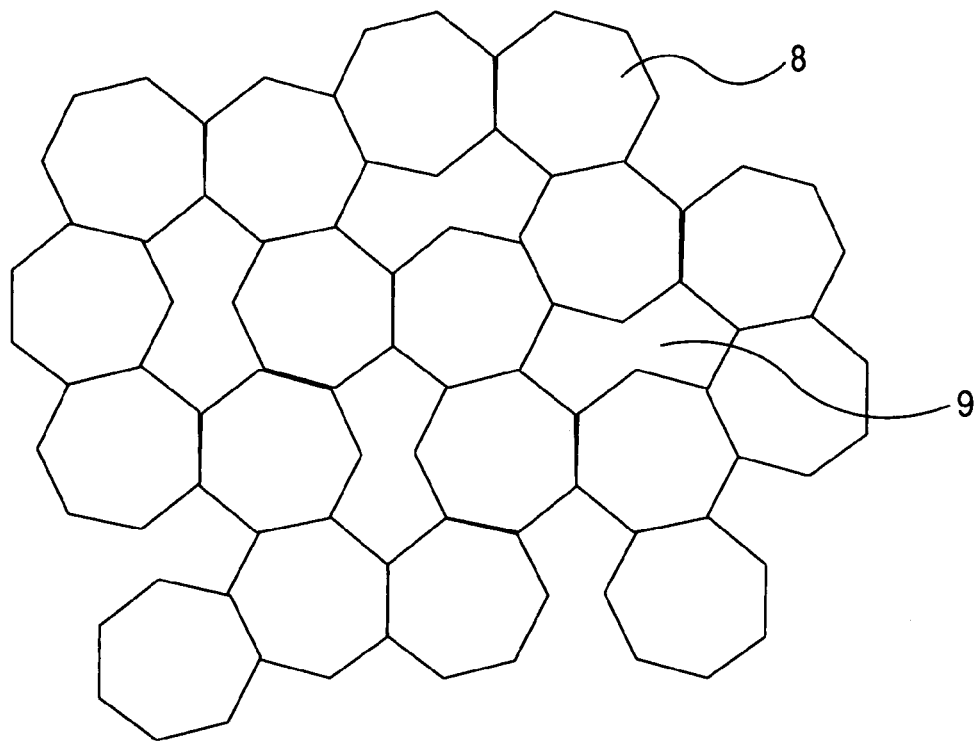
FIG. 19 is a diagram showing a pattern of micro lenses according to a tenth embodiment of the present invention.

A diffuser panel shown in FIG. 19 is an example where n=3 and m=8. This diffuser panel has a configuration in which arrangements of heptagonal micro lenses 8 and octagonal areas 9 are different from that on the diffuser panel shown in FIG. 18.

Figure 20:
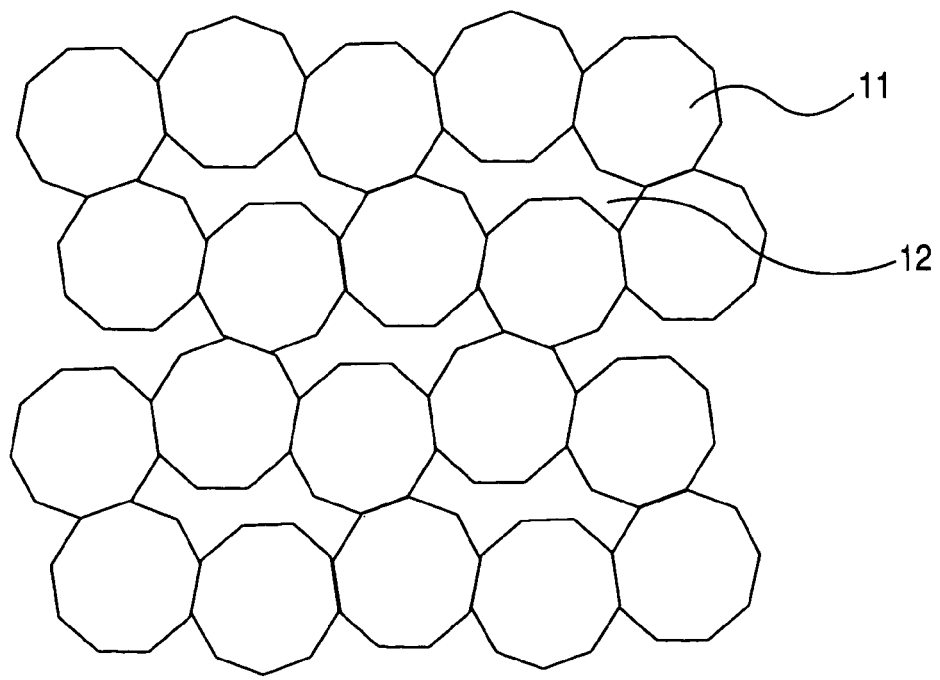
FIG. 20 is a diagram showing a pattern of micro lenses according to an eleventh embodiment of the present invention.

A diffuser panel shown in FIG. 20 is an example in which n=4 and m=12. This diffuser panel has a configuration consisting of nonagonal micro lenses 11 and dodecagonal areas 12.

Now, description will be made of a method for manufacturing the diffuser panel according to the present invention.

Figure 21:
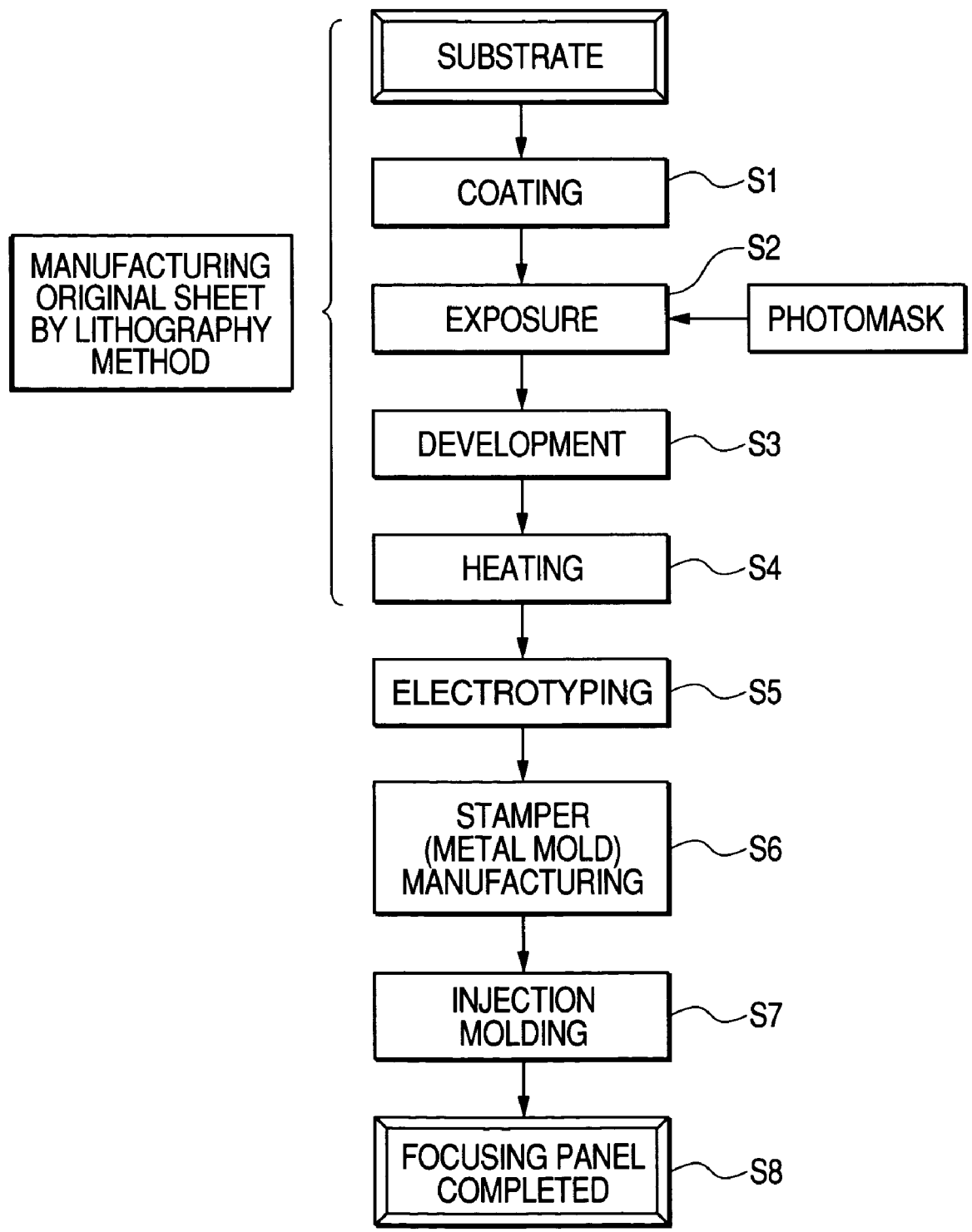
FIG. 21 is a flow chart showing steps for manufacturing the diffuser panel according to the present invention.
Figure 22:
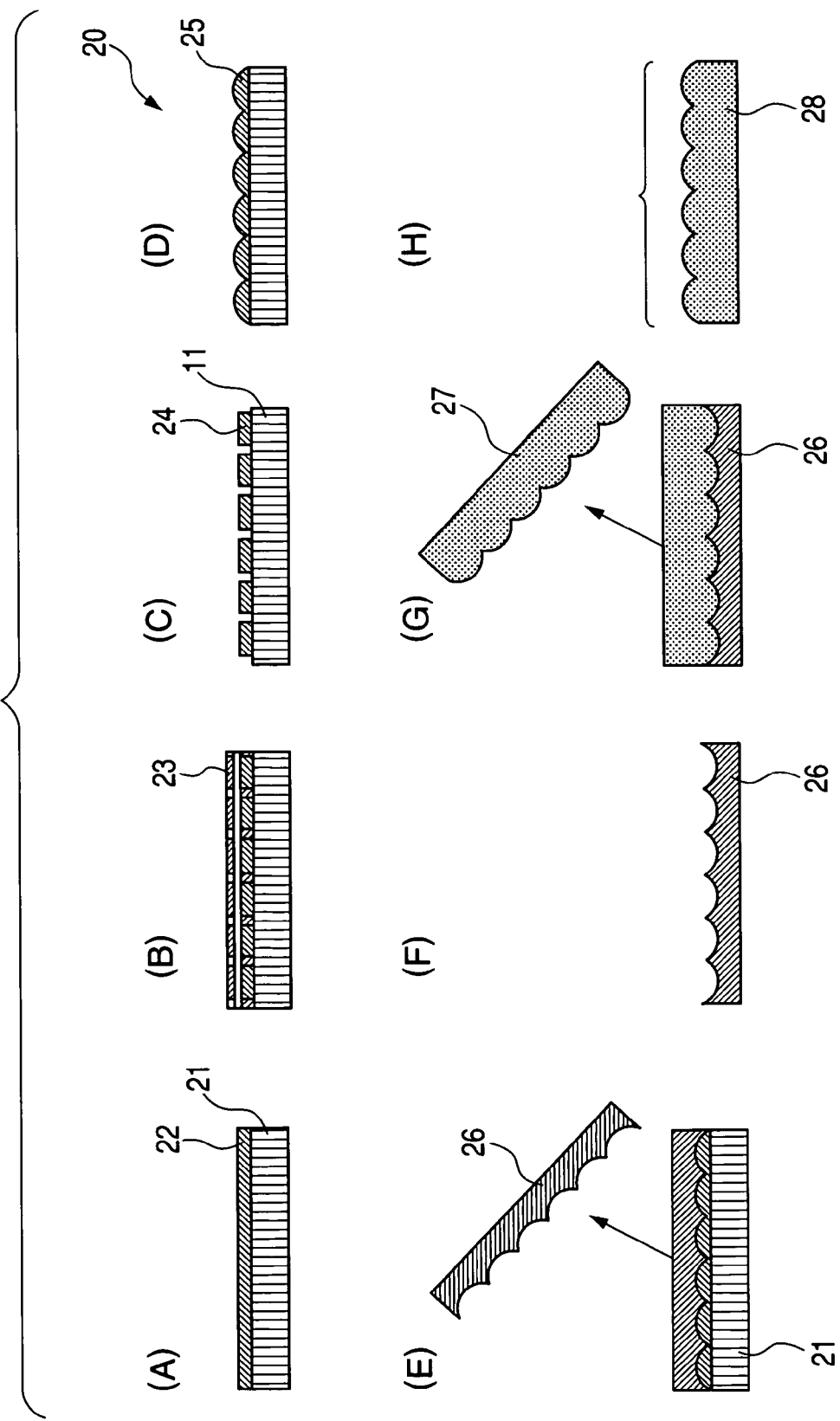
FIG. 22 is a diagram showing a method for manufacturing the diffuser panel according to the present invention.

FIGS. 21 and 22 are diagrams showing manufacturing steps and a manufacturing method respectively for the diffuser panel according to the present invention. First, a coating step S1 is carried out for a substrate shown in FIG. 21. Speaking concretely, a photoresist 22 which is a thermally deformable photosensitive material is coated uniformly to a predetermined thickness within a range of 0 to 20 μm on a substrate 21 as shown in (A) of FIG. 22 by a known method, for example, a spin method. To be used as the photoresist is, for example, a mixture of a solvent medium such as THMK-jp3100 or TMR-P10 (prepared by Tokyo Ohka), resin and a photosensitive agent. Then, the photoresist is pre-baked to density a photoresist film by purging solvents and moisture remaining in the photoresist 22.

Then, an exposure step S2 and a development step S3 in FIG. 21 are carried out. To carry out these steps, a photomask 23 on which a lens pattern has been formed is optically patterned (exposed) with an exposure apparatus as shown in (B) of FIG. 22. Thereafter, a resist pattern is formed by carrying out stationary paddle development and rinsing.

It is ordinary at this stage to post-bake a photoresist film for enhancing an adhesive property of the photoresist film by removing a residual developer and a rinsing liquid. However, pest beta is not carried out to enhance a fluidity of the photoresist at a next photoresist heating treatment step. Furthermore, a photoresist film 24 on which a pattern has been formed does not have a shape of a lens as shown in (C) of FIG. 22.

Then, a heating step S4 in FIG. 21 is carried out. Speaking concretely, a heating treatment is carried out in an oven filled with N2 gas at the heating step S4 so that the phostoresist film on which the pattern has been formed is shaped into a shape of a lens.

At this melt flow step, a heating treatment is carried out at a high temperature. This heat treatment temperature is not lower than a temperature at a softening point of the resist. Furthermore, a time optimum for forming a desired shape of a lens is to be determined preliminarily. This time is to be adopted as a heating time. By this heating treatment, the photoresist is fused, flowed and transformed dependently on a heat deformation property and a surface tension at this step, whereby a lens shape 25 is formed as shown in (D) of FIG. 22. The photoresist which has been shaped into a lens shape 14 is cooled and hardened.

An original sheet 20 on which a micro lens array has been formed as shown in (D) of FIG. 22 is completed by the steps described above.

Then, the original sheet 20 is coated with an electrically conductive film such as Ni at an electrotyping step S5. Furthermore, a pattern on the original sheet 20 is transferred to Ni or the like by laminating several millimeters of NI or the like as shown in (E) of FIG. 22, thereby forming an electrotype 26.

On the basis of the electrotype 26 shown in (F) of FIG. 22, a step S6 of working an injection molding metal mold (stamper) 27 shown in (G) of FIG. 22 is carried out.

A diffuser panel (focusing panel) is formed by using the injection molding metal mold 27. For forming the diffuser panel, a micro lens array 28 is made of acrylic resin or the like by an injection molding method. This micro lens array is formed at a step S8 in FIG. 21 and a step shown in (H) of FIG. 22.

Description has been made above of a diffuser panel which has one kind of micro lenses. For manufacturing a diffuser panel which has two or more kinds of micro lenses having different heights, two or more kinds of photomasks are to be prepared as shown in FIG. 23.

Figure 23:
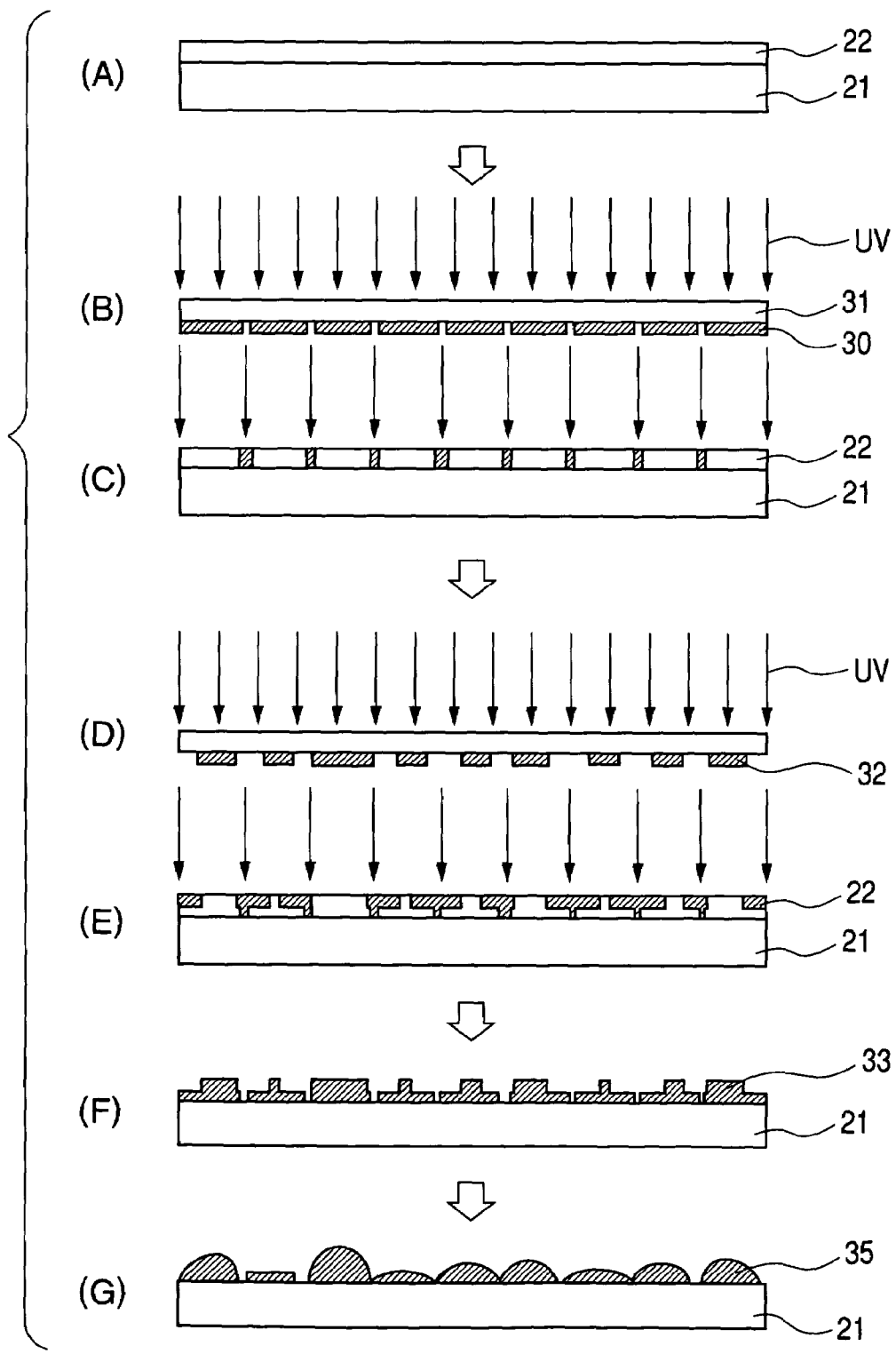
FIG. 23 is a diagram showing another method for manufacturing another diffuser panel according to the present invention.

Shown in (A) of FIG. 23 is a planar substrate 21 on which a photoresist layer is disposed. The planar substrate 21 is made of Si. Using a first photomask 30 as described above, the photoresist layer is exposed by irradiating ultraviolet rays UV. The first photomask 30 has a first kind (height)of lens pattern which is formed on a surface of a quartz plate 31. Furthermore, the photoresist layer is exposed using a second photomask 32 on which a second kinds (height) of lens pattern is formed as shown in FIG. 23(D).

The photoresist layer is exposed using the first and second photomasks consecutively. The photoresist layer which has been exposed is developed to prepare a substrate of a resist layer which has a pattern as shown in FIG. 23(F). This substrate is treated by a method described with reference to FIG. 22(D), thereby preparing a substrate which has a micro lens pattern 35.

This substrate is subjected to steps similar to the steps (E), (F), (G) and (H) in FIG. 22. A diffuser panel which has two kinds of micro lenses at different height is formed through these steps.

Figure 24:
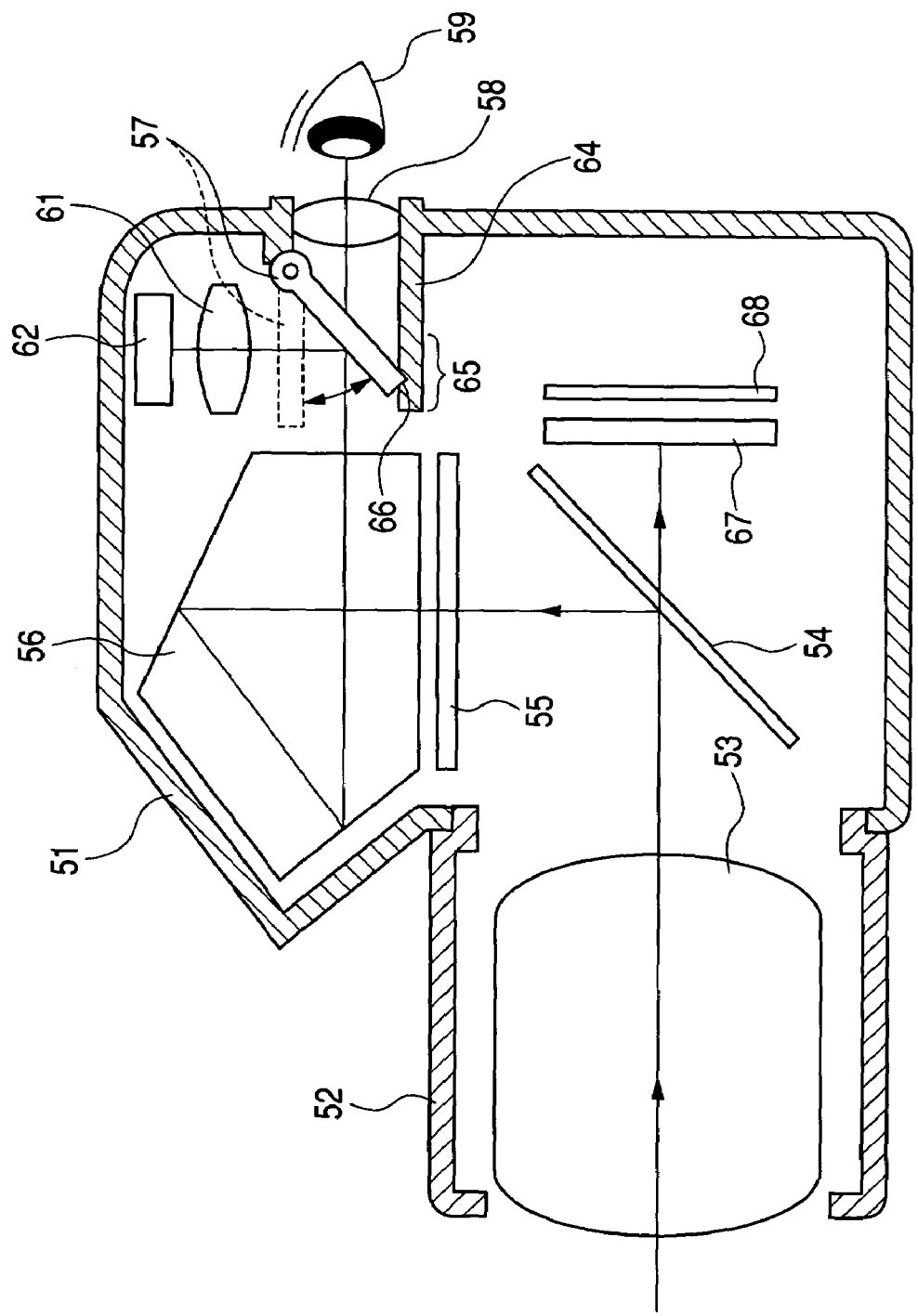
FIG. 24 is a diagram showing an example of an optical apparatus which uses the diffuser panel according to the present invention, or a single-lens reflex camera which uses the diffuser panel according to the embodiment of the present invention as a focusing panel.

FIG. 24 shows a single lens reflex camera as an example of apparatus according to the present invention. This single-lens reflex camera is configured to be capable of photographing an object even with an image pickup device 62. However, the image pickup device 62 is assumed not to be used in this embodiment.

In FIG. 24, a detachable photographic lens barrel is attached to a camera body 51. This photographic lens barrel 52 comprises a photographic optical system 53. Approximately 30% of a light bundle which has been emitted from an object and passed through this photographic optical system is reflected by a splitting mirror 54 which consists of a half mirror, a pericle mirror or the like.

The light bundle which has been reflected by the splitting mirror 54 is condensed onto a focusing panel 55. Accordingly, an image of the object is formed on the focusing panel 55. Used as the focusing panel 55 is any one of the diffuser panels according to the above described embodiments.

Furthermore, the image of the object is led through a pentagonal prism 56 to a finder mirror 57 which is movable in a direction indicated by an arrow. In a case where the finder mirror 57 is located at a position traced in a dashed line (an up condition), the above described image of the object is observable by an observer's eye 59 through an eyepiece 58.

In a case where the above-mentioned mirror is located at a position traced in a solid line (a down condition), on the other hand, the image of the object which is reflected by the finder mirror 57 is image on the image pickup device 62.

The finder mirror 57 is fixed at the position in the down condition traced in the solid line as described above. At this time, a tip portion of the finder mirror 57 is in contact with a receiver member 66 of a mirror receiving portion which is formed on a light shielding wall 64. In addition, an eyepiece side of the finder mirror 57 is composed of a member which has a light shielding property. Accordingly, rays incident reversely from the eyepiece lens 58 are shielded by the finder mirror 57.

Furthermore, approximately 70% of the light bundle which is not reflected by the splitting mirror 54 transmits through the splitting mirror 54. This light bundle is led to a silver salt film (hereinafter referred to simply as a film) 68 through a focal-plane shutter 67. At a photographing time, the above-mentioned focal-plane shutter 67 is set in an open condition and an image of an object is formed on the film 68.

Figure 25:
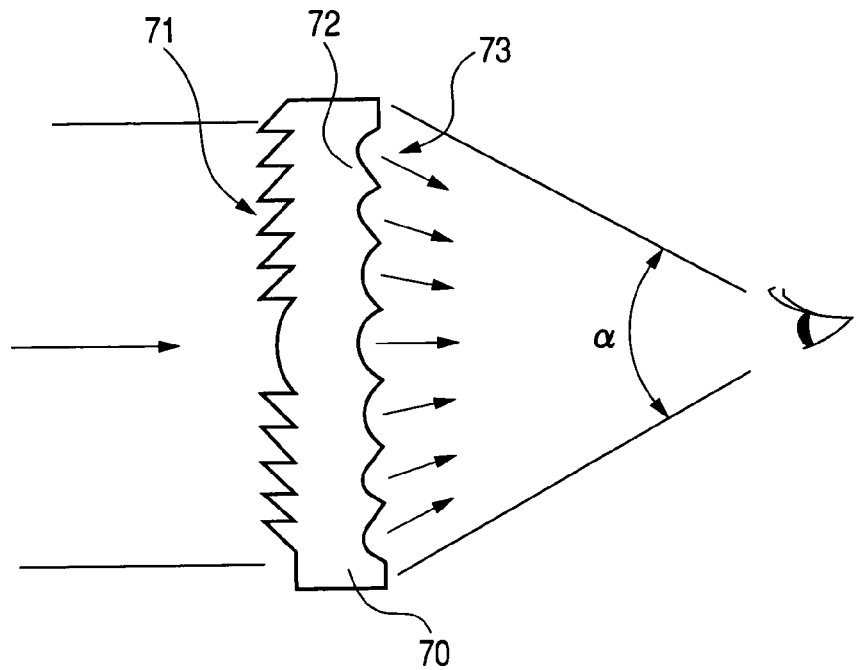
FIG. 25 is a diagram showing a diffuser panel which has a diffusing surface and a Fresnel surface.
Figure 26:
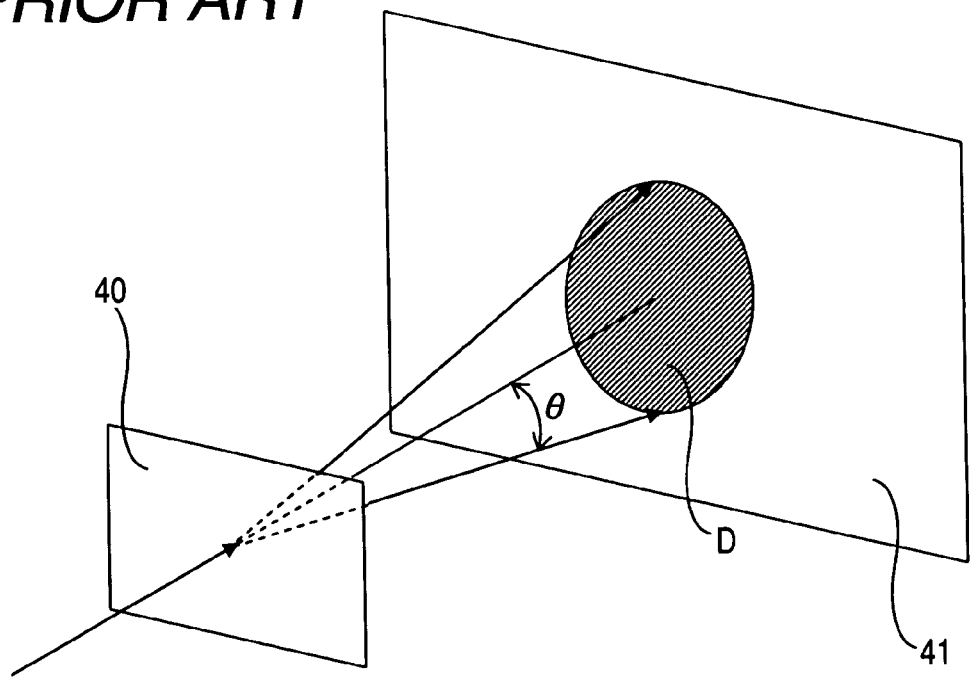
FIG. 26 is a diagram showing a diffusing condition of a conventional diffuser panel.
Figure 27:
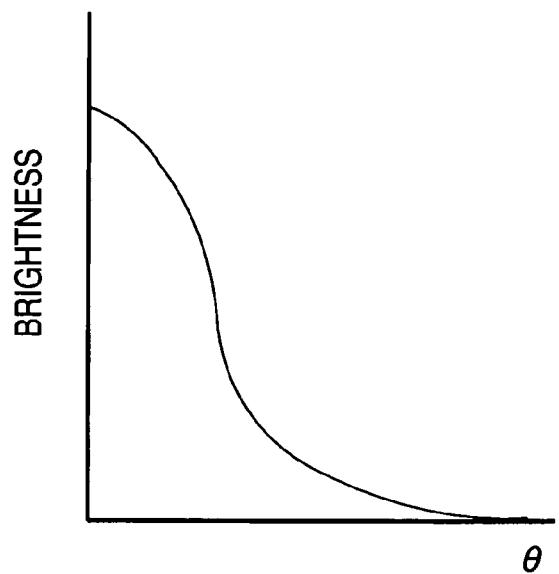
FIG. 27 is a diagram showing an amount distribution of rays diffused by the conventional diffuser panel.
Figure 28:
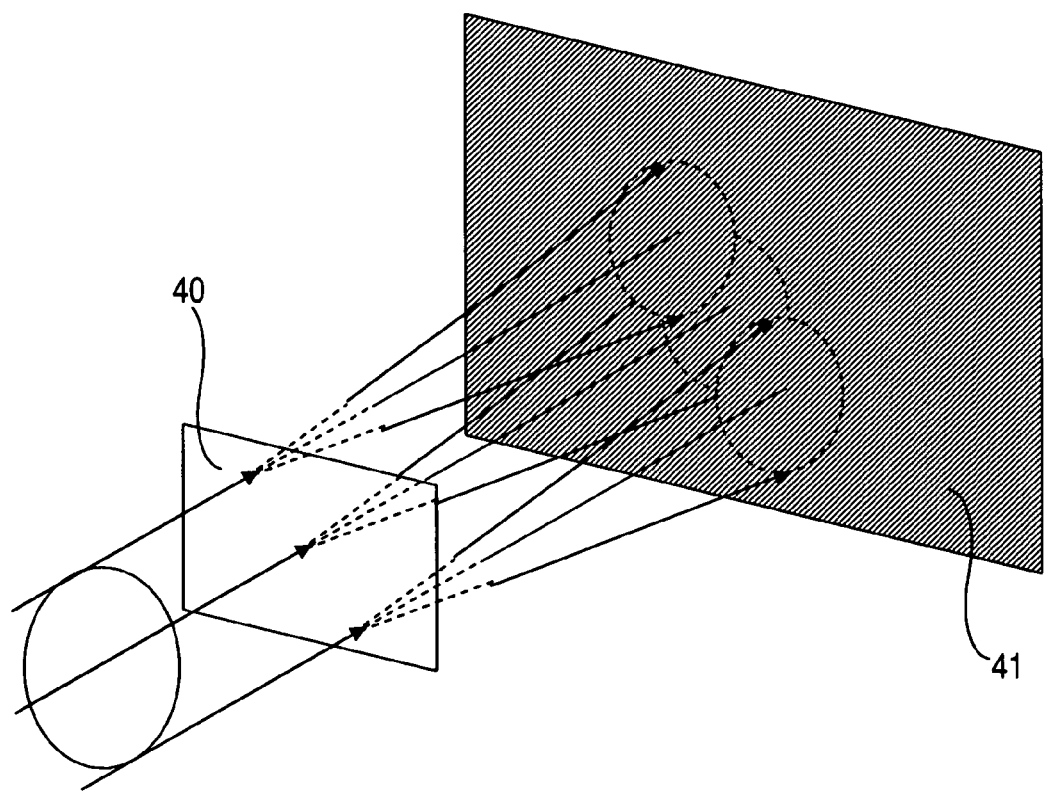
FIG. 28 is a diagram showing a condition where rays at a uniform brightness are incident on an entire surface of the conventional diffuser panel used as a focusing panel.
Figure 29:
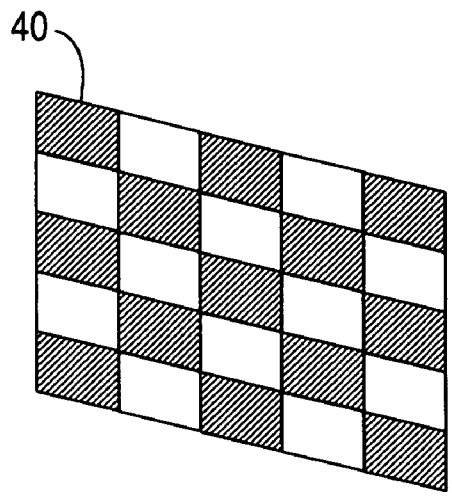
FIG. 29 is a diagram showing a condition where rays having bright-dark patterns are incident on a focusing panel.
Figure 30:
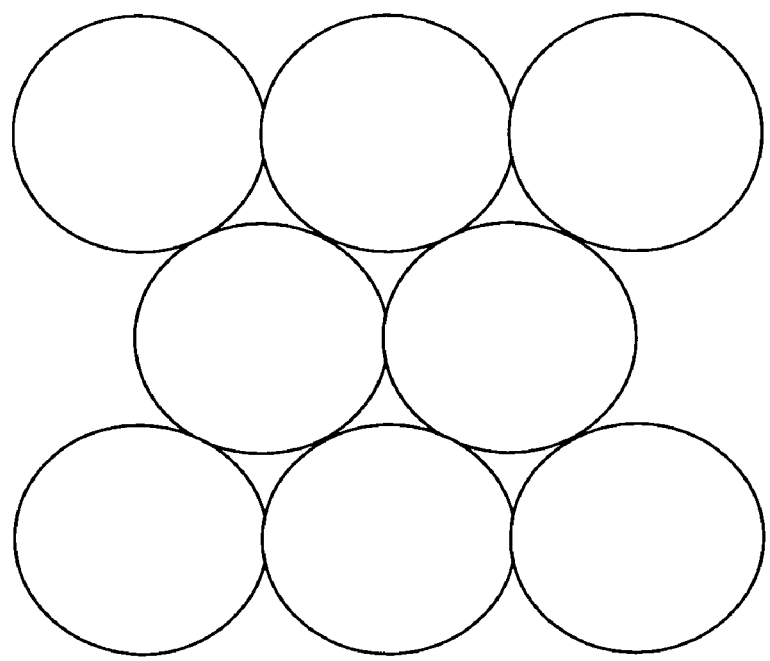
FIG. 30 is a diagram showing a portion of a diffuser panel which consists of micro lenses which have a circular outer circumferential shape.
Figure 31:
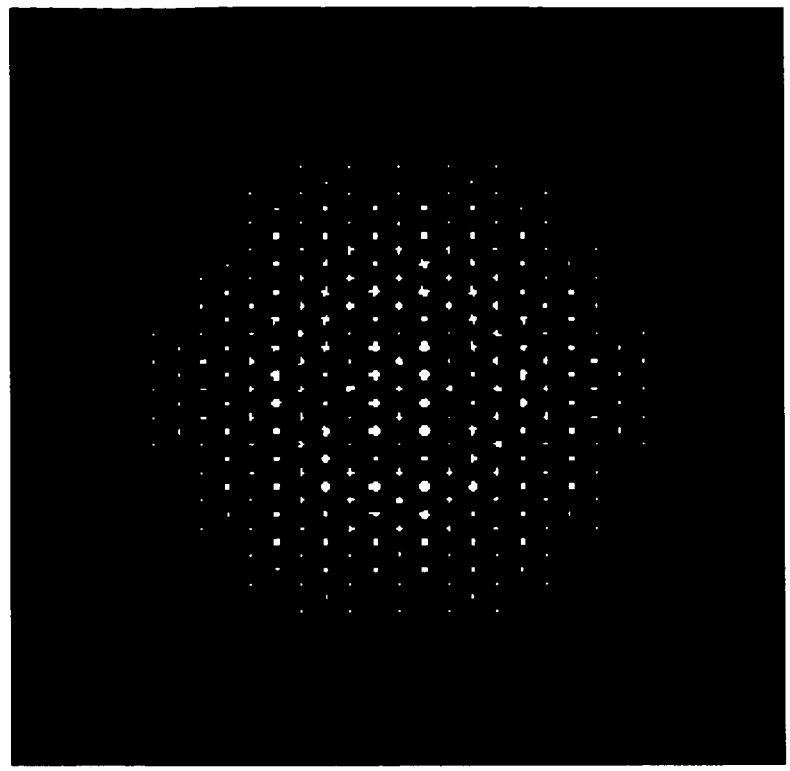
FIG. 31 is a diagram showing a diffusion pattern of the diffuser panel shown in FIG. 30.
Figure 32:
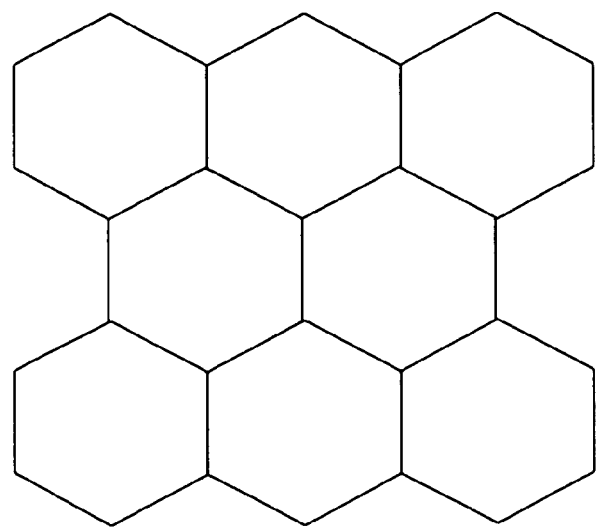
FIG. 32 is a diagram showing a portion of a diffuser panel which consists of micro lenses having a hexagonal outer circumferential shape.
Figure 33:
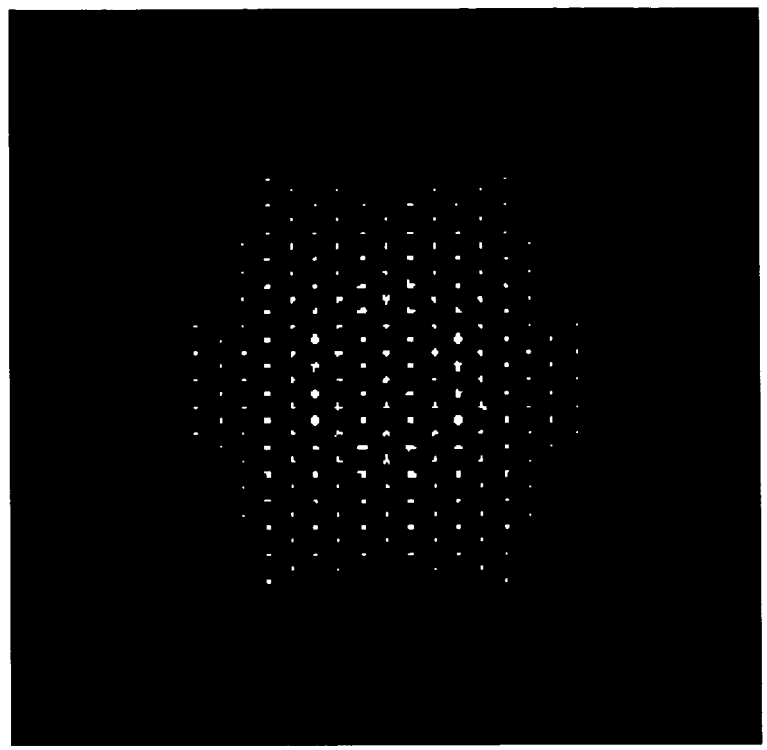
FIG. 33 is a diagram showing a diffusion pattern of the diffuser panel shown in FIG. 32.

Furthermore, the diffuser panel according to the above described embodiment may have another function on a surface on a side opposite to a surface which has a diffusing function. The surface on the opposite side may be configured as a Fresnel surface, for example, as shown in FIG. 25. A diffuser panel shown in FIG. 25 is a focusing panel 70 which has a Fresnel surface on a side and a matte surface 73 having fine concave and convex patterns 72 on the other side.

In FIG. 25, a light condensing function is imparted to the surface on the side opposite to the surface having the diffusing function. Accordingly, the diffuser panel makes it possible to design another optical system more freely when the diffuser panel is used as a focusing panel of a single lens reflex camera shown in FIG. 24.

The diffuser panel according to the present invention which is configured as described above is usable as a diffuser panel which diffuses rays uniformly in all directions within a diffusion area and provides a smooth a light amount distribution change.

When the diffuser panel is used as a focusing panel of an optical apparatus, the diffuser panel provides an image which gives a naturally blurred impression in spite of high brightness of the image.

The diffuser panel according to the present invention is configured taking a productivity into consideration as a diffuser panel which reduces a ring-like distribution, has favorable diffusion pattern and light amount distribution, and provides a bright image giving a naturally blurred impression. Accordingly, the diffuser panel according to the present invention is capable of exhibiting an excellent effect in particular when the diffuser panel is used as a focusing panel of a camera.

The invention claimed is:

1. A diffuser panel comprising:
   a base panel portion and;
   a micro lens portion which is arranged on a surface of said base panel portion and has a plurality of micro lenses, wherein each of said plurality of micro lenses have outer circumferential shapes which have angles in a numbers of (2n+1), and wherein a number of predetermined micro lenses have an outer circumferential shape having angles in the numbers of (2n+1) at any one value of n is not smaller than half a total number of said micro lenses,
where n represents an integer of 2 or larger.

2. A The diffuser panel according to claim 1,
wherein said micro lens portion further has areas consisting of micro lenses in a shape which has angles in a number of m, and
wherein said areas consisting of the micro lenses in a shape which has angles in the number of m are formed in a condition surrounded by said predetermined micro lenses, where m represents an integer of 3 or larger.

3. The diffuser panel according to claim 1 or 2,
wherein a plurality of said predetermined micro lenses comprise at least micro lenses having a first height and micro lenses having a second height, and
wherein said first height is different from said second height.

4. The diffuser panel according to claim 3,
wherein the micro lenses which have said first height are arranged at a first period and the micro lenses which have said second height are arranged at a second period, and
wherein said first period is different from said second period.

5. The diffuser panel according to claim 3, satisfying the following condition:

$$1.5 < h1/h2 < 3$$

wherein a reference symbol h1 represents said first height and a reference symbol h2 designates said second height.

6. The diffuser panel according to claim 1 or 2, wherein the micro lenses are polygonal micro lenses whose value of said n is 4 or smaller.

7. The diffuser panel according to claim 2, wherein said areas in the shape having m angles are planar portions which are in a sand-blasted condition.

8. The diffuser panel according to claim 2, wherein said areas in the shape having the m angles are formed with micro lenses.

9. The diffuser panel according to claim 2 further comprising lens blocks arranged at a predetermined period, wherein said lens block comprises said area in a shape which has angles in the number of m and at least two of the predetermined micro lenses.

10. The diffuser panel according to claim 1 further comprising lens blocks arranged at a predetermined period,
wherein said lens block comprises at least two of said predetermined micro lenses.

11. A diffuser panel comprising:
a base panel portion and;
a micro lens portion which is arranged on a surface of said base panel portion and has a plurality of micro lenses,
wherein each of the plurality of micro lenses has an outer circumferential shape which has angles in numbers of n,
wherein a number of predetermined micro lenses which have an outer shape having angles in the numbers of n at any one value of n is not smaller than half a total number of said micro lenses and
wherein one side of the predetermined micro lenses does not intersect orthogonally with a virtual line connecting vertices of optional two of the predetermined micro lenses
where n represents an integer of 5 or larger.

12. A diffuser panel comprising:
a base panel portion and;
a micro lens portion which is arranged on a surface of said base panel portion and has a plurality of micro lenses,
wherein each of said plurality of micro lenses have outer circumferential shares which have angles in numbers of n and
wherein a number of predetermined micro lenses have an outer circumferential shape which have angles in the numbers of n at any one value of n is not smaller than half a total number of said plurality of micro lenses and
wherein the predetermined micro lenses includes first micro lenses and second micro lenses,
some micro lenses of the second micro lenses are in contact with one micro lens of the first micro lenses with side respectively, and
wherein virtual lines which connect vertices of the one micro lens of the first micro lenses and the some of micro lens of the second micro lenses respectively are not in parallel with one another,
where n represents an integer of 5 or larger.

13. The diffuser panel according to claim 11 or 12, further comprising lens blocks arranged at a predetermined period, wherein said lens block consists of at least two of said predetermined micro lenses.

14. The diffuser panel according to claim 11 or 12, wherein a height of said micro lens is not lower than 0.6 μm and not higher than 7 μm.

15. The diffuser panel according to claim 1, 2, 11 or 12, wherein a distance between vertices of said micro lenses is not shorter than 3 μm and not longer than 30 μm.

16. The diffuser panel according to claim 1, 2, 11 or 12, wherein a surface on a side opposite to a surface on which said plurality of micro lenses are arranged is a Fresnel surface.

17. A focusing panel for an image pickup device using the diffuser panel according to claim 1, 2, 11 or 12.

18. An optical apparatus comprising the diffuser panel according to claim 1, 2, 11 or 12.

19. A diffuser panel comprising:
a base panel portion and;
a micro lens portion which is arranged on a surface of said base panel portion and has a plurality of micro lenses,
wherein each of said plurality of micro lenses has an outer circumferential shape which has angles in numbers of n,
wherein a number of predetermined micro lenses which have an outer circumferential shape having angles in a number of n at any one value of n is not smaller than half a total number of said micro lenses, and
wherein each of said predetermined micro lenses has one side which length is different from other sides,
where n represents an integer of 5 or larger.

20. The diffuser panel according to claim 19,
wherein said predetermined micro lenses have the same outer circumferential shape.

21. The diffuser panel according to claim 19, wherein said micro lens portion consists only of said predetermined micro lenses.

* * * * *